(12) United States Patent
Choi et al.

(10) Patent No.: US 8,346,741 B2
(45) Date of Patent: Jan. 1, 2013

(54) MEDIA MEDIATOR SYSTEM AND METHOD FOR MANAGING CONTENTS OF VARIOUS FORMATS

(75) Inventors: Jun Kyun Choi, Daejeon (KR); Jinhong Yang, Daejeon (KR); Hyojin Park, Daejeon (KR); Kyong-Il Cho, Gyeonggi-do (KR); Yongrok Kim, Daejeon (KR); Won Ryu, Daejeon (KR); Hyun Woo Lee, Daejeon (RE); Changwoo Yoon, Daejeon (KR); Seng Kyoun Jo, Chungcheongbuk-do (KR)

(73) Assignees: Korea Advanced Institute of Science and Technology, Daejeon (KR); Electronics and Telecommunications Research Institute, Deajeon (KR)

( * ) Notice: Subject to any disclaimer, the term of this patent is extended or adjusted under 35 U.S.C. 154(b) by 297 days.

(21) Appl. No.: 12/694,434

(22) Filed: Jan. 27, 2010

(65) Prior Publication Data

US 2011/0055176 A1  Mar. 3, 2011

(30) Foreign Application Priority Data

Sep. 2, 2009  (KR) .................. 10-2009-0082472

(51) Int. Cl.
*G06F 7/00* (2006.01)

(52) U.S. Cl. .................. 707/694; 707/756; 707/795

(58) Field of Classification Search .................. None
See application file for complete search history.

(56) References Cited

U.S. PATENT DOCUMENTS

| | | | |
|---|---|---|---|
| 8,041,186 B1* | 10/2011 | Black | 386/248 |
| 2004/0163123 A1* | 8/2004 | Okada et al. | 725/116 |
| 2005/0049886 A1* | 3/2005 | Grannan et al. | 705/1 |
| 2005/0203931 A1* | 9/2005 | Pingree et al. | 707/100 |
| 2006/0143435 A1* | 6/2006 | Kwon | 713/150 |
| 2007/0268164 A1* | 11/2007 | Lai et al. | 341/51 |
| 2007/0282908 A1* | 12/2007 | Van der Meulen et al. | 707/104.1 |
| 2008/0005028 A1* | 1/2008 | Wakabayashi et al. | 705/51 |

(Continued)

FOREIGN PATENT DOCUMENTS

EP  2293205 A1 * 3/2011

(Continued)

OTHER PUBLICATIONS

Gyu Myoung Lee and Jun Kyun Choi, "Personalized IPTV Services Using Web-based Open Platform in NGN", Global Telecommunication Conference, Nov. 30, 2008-Dec. 4, 2008, IEEE, 2008.*

Jun Kyun Choi, et al., "Web-based personalized IPTV Services over NGN", ICCCN 2008, Aug. 2008.*

(Continued)

*Primary Examiner* — Vei-Chung Liang
(74) *Attorney, Agent, or Firm* — Pearne & Gordon LLP

(57) ABSTRACT

Provided is a system and method that may encode various formats of contents to a single format and thereby manage the contents, and may transform the contents to a format corresponding to a request of a third party or an end user to distribute the content. A media mediator system of managing various formats of contents may include: a service manager to receive a content and metadata of the content from a content provider; a metadata manager to register the content using the metadata, and to store the metadata of the registered content; a database manager to store and manage information associated with the content; and an encoding manager to schedule an encoding sequence of the content, and to sequentially encode the content based on a scheduling result.

13 Claims, 20 Drawing Sheets

U.S. PATENT DOCUMENTS

| | | | |
|---|---|---|---|
| 2008/0033725 A1* | 2/2008 | Peak et al. | 704/260 |
| 2008/0155614 A1* | 6/2008 | Cooper et al. | 725/91 |
| 2008/0281945 A1* | 11/2008 | Gill et al. | 709/219 |
| 2009/0012992 A1* | 1/2009 | Gill et al. | 707/103 R |
| 2009/0013048 A1* | 1/2009 | Partaker et al. | 709/206 |
| 2009/0150941 A1* | 6/2009 | Riedl et al. | 725/61 |
| 2009/0181656 A1* | 7/2009 | Matsumoto | 455/414.3 |
| 2011/0116540 A1* | 5/2011 | O'Connor et al. | 375/240.02 |
| 2011/0161086 A1* | 6/2011 | Rodriguez | 704/270 |

FOREIGN PATENT DOCUMENTS

| | | |
|---|---|---|
| EP | 2293566 A3 * | 5/2011 |
| KR | 10-2003-0042255 A | 5/2003 |
| KR | 10-2009-0008016 A | 1/2009 |

OTHER PUBLICATIONS

Hyo-Jin Park, et al., "A Video-on-Demand Transmission Scheme for IPTV Service with Hybrid Mechanism", May 19-23, 2008, ICC 2008, Beijing, China.*

Gyu Myoung Lee, "Functional Architecture for NGN-Based Personalized IPTV Services", IEEE Transactions on Broadcasting, vol. 35, No. 2 Jun. 2009, pp. 329-342.*

Jun Kyun Choi, et al., "Open IPTV Services over NGN", IEICE 2008, Oct. 2008.*

Jihye Lyu, et al., "Design of Open APIs for Personalized IPTV Service", ICACT Feb. 12-14, 2007.*

* cited by examiner

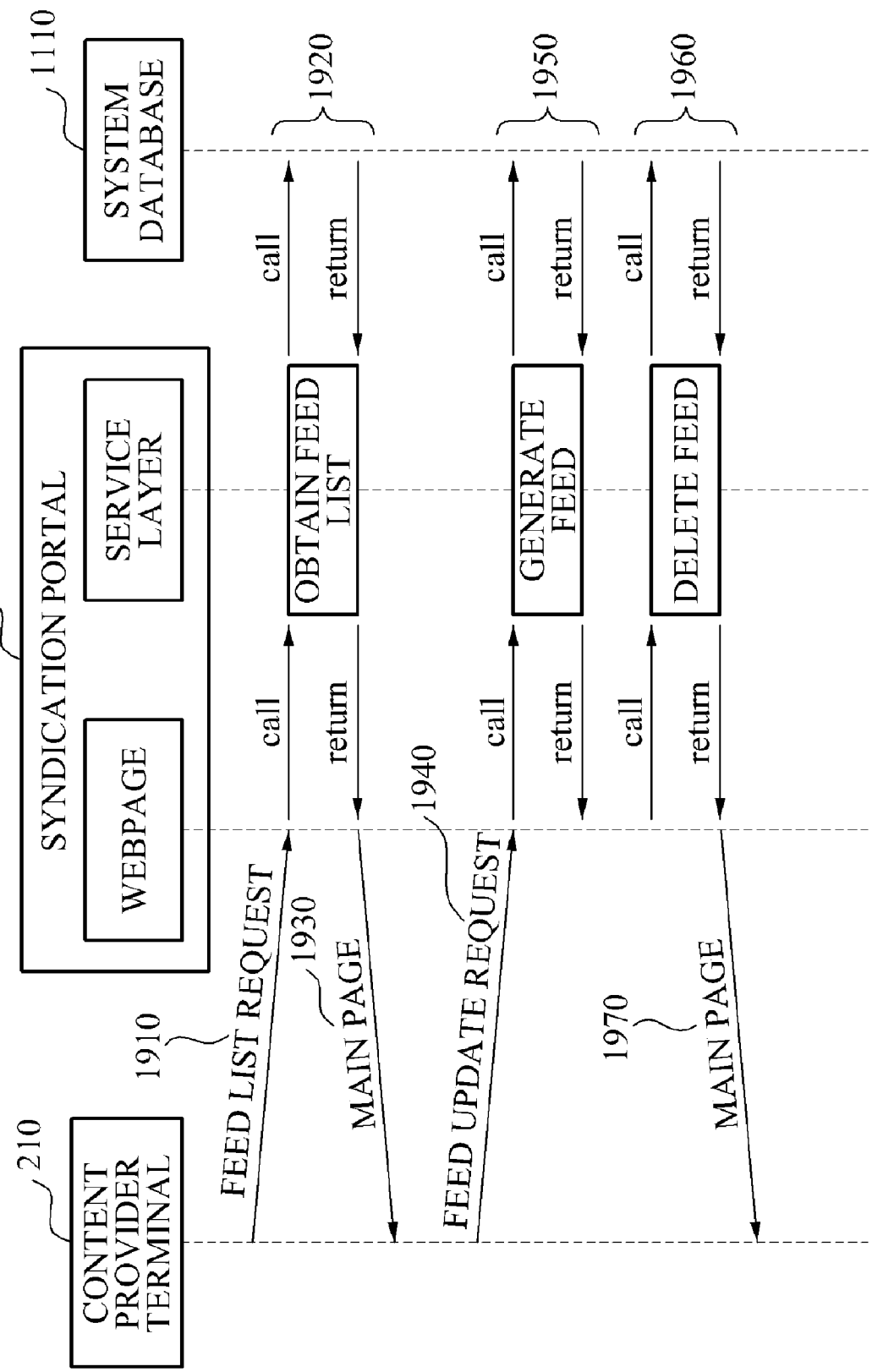

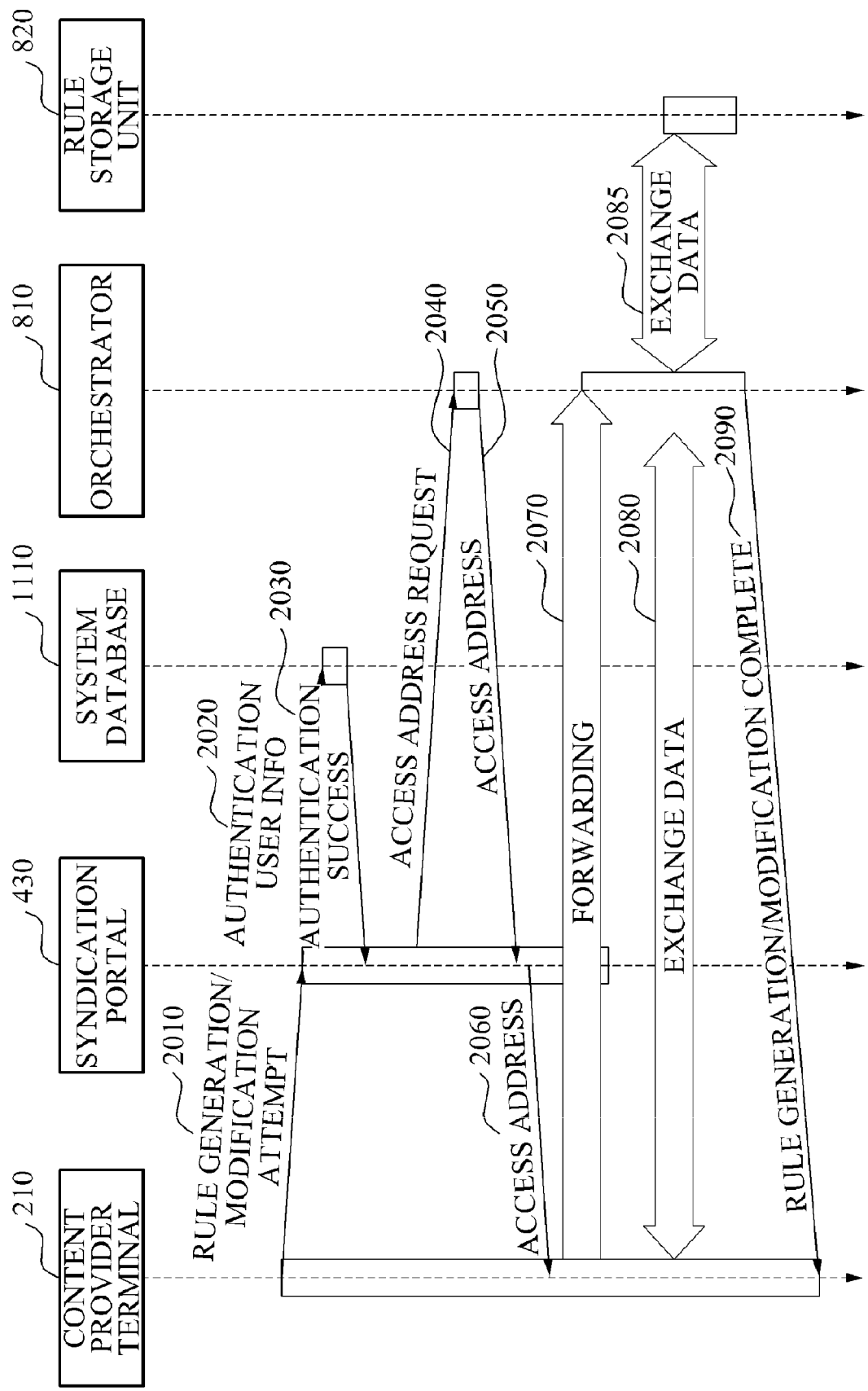

MEDIA MEDIATOR SYSTEM AND METHOD FOR MANAGING CONTENTS OF VARIOUS FORMATS

CROSS-REFERENCE TO RELATED APPLICATION

This application claims the benefit of Korean Patent Application No. 10-2009-0082472, filed on Sep. 2, 2009, in the Korean Intellectual Property Office, the disclosure of which is incorporated herein by reference.

BACKGROUND

1. Field of the Invention

The present invention relates to a system and method that may encode various formats of contents to a single format and thereby manage the contents, and may transform the contents to a format corresponding to a request of a third party or an end user to distribute the contents.

2. Description of the Related Art

In a conventional content providing service using a network, when various content providers provide contents to a service provider using a different platform, the service provider may provide the contents to an end user using the same platform as the platform of the service provider.

However, when a content desired by the end user is provided by only another service provider using a platform not owned by the end user, the end user may need to purchase a device or a system using the corresponding platform, or abandon efforts to receive the content.

The service provider or the content provider may be limited to providing contents to only a number of end users using the corresponding platform, and thus may have limited revenues or limited advertising effect with respect to providing of contents.

Accordingly, there is a need for a system and method that may provide contents to all end users without restrictions on a type of a platform used by a service provider or a type of platform used by a content provider for a content creation.

SUMMARY

An aspect of the present invention provides a system and method that may upload contents from a plurality of service providers and content providers using different platforms, and transform the uploaded contents to a single platform to thereby provide all end users with the contents transformed to the single platform, and thus enable all the end users to receive a content provided by a service provider using a different platform.

Another aspect of the present invention also provides a system and method that may transform an uploaded content to a platform desired by another service provider and then provide the other service provider with the content transformed to the desired platform and thereby may easily increase a number of target users to receive the content.

Another aspect of the present invention also provides a system and method that may enable a system side to periodically verify and upload a content of a content provider, and thereby may enable the content provider to provide the content without a separate uploading process.

According to an aspect of the present invention, there is provided a media mediator system of managing various formats of contents, including: a service manager to receive a content and metadata of the content from a content provider; a metadata manager to register the content using the metadata, and to store the metadata of the registered content; a database manager to store and manage information associated with the content; and an encoding manager to schedule an encoding sequence of the content, and to sequentially encode the content based on a scheduling result.

According to another aspect of the present invention, there is provided a method of managing various formats of contents, the method including: setting, by an end user, a format of the content desired by the end user; receiving, by a service manager, a content and metadata of the content from a content provider; registering, by a metadata manager, the content and the metadata of the content to a database manager; encoding, by an encoding manager, the content; and providing, by the service manager, the encoded content to the end user.

According to embodiments of the present invention, it is possible to provide all end users with contents uploaded from a plurality of service providers and content providers using different platforms, and transformed to a single platform, and thus to enable all the end users to receive a content provided by a service provider using a different platform by uploading the contents, and transforming the uploaded contents to the single platform.

According to embodiments of the present invention, it is possible to easily increase a number of target users to receive a content by transforming an uploaded content to a platform desired by another service provider and then providing the other service provider with the content transformed to the desired platform.

According to embodiments of the present invention, it is possible to enable a content provider to provide a content without a separate uploading process by enabling a system side to periodically verify and upload the content of the content provider.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 19 is a diagram illustrating a process of managing, by a syndication portal, a feed according to an embodiment of the present invention; and FIG. 20 is a diagram illustrating a process of setting or modifying a metadata format of a content in a system of managing various formats of contents according to an embodiment of the present invention.

DETAILED DESCRIPTION

Figure 1:
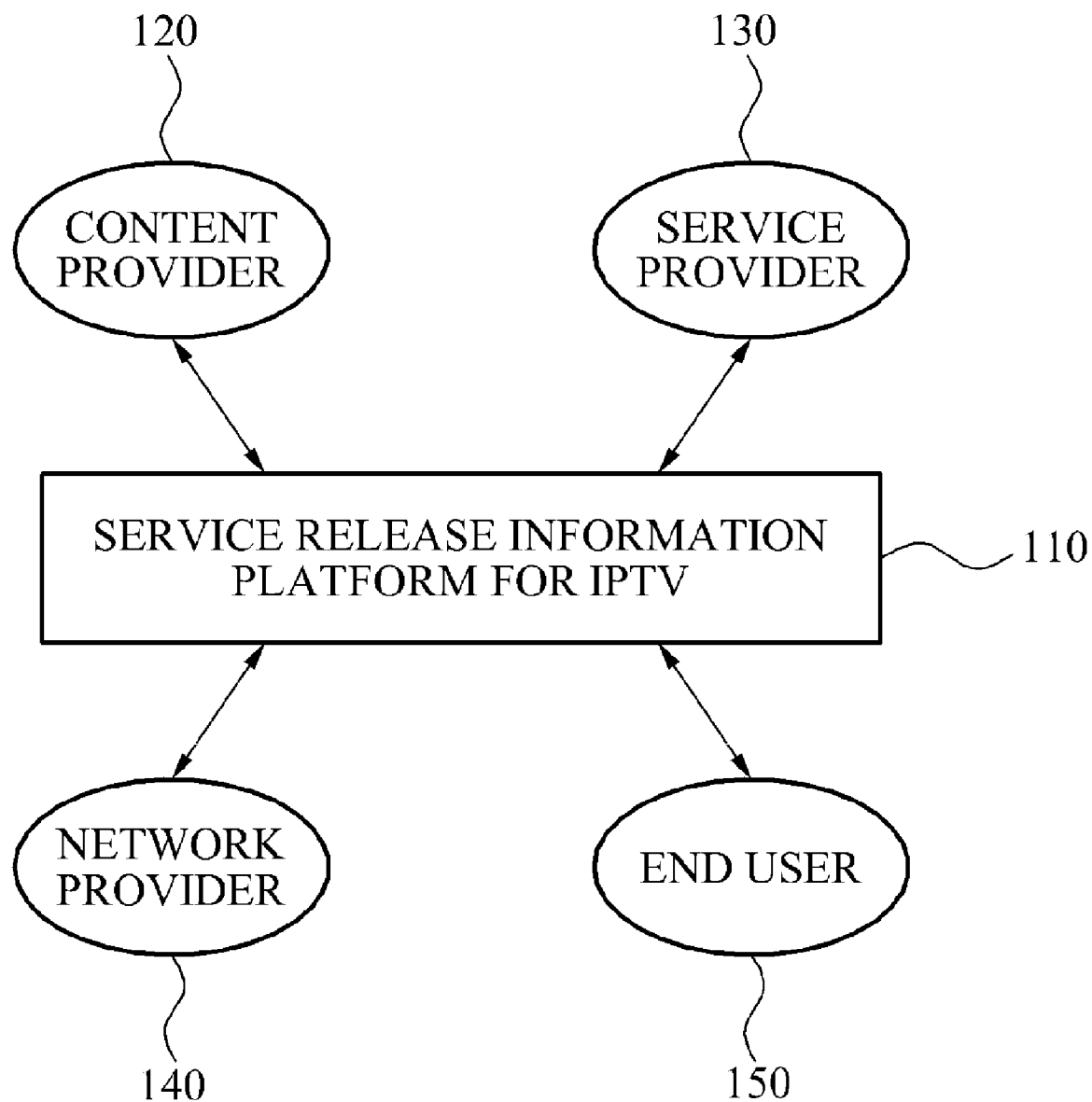
FIG. 1 is a diagram illustrating a relationship among users associated with a service release information platform for an Internet Protocol Television (IPTV) according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

According to embodiments of the present invention, in a system of providing contents to end users over a network such as an Internet Protocol Television (IPTV), it is possible to provide the end users with contents created by content providers by automatically uploading the contents at predetermined intervals, and by transforming various formats of the uploaded contents to a single format.

In addition, when a third party desires to provide a content using a different format, an uploaded content may be transformed to the different format and be provided to the third party. Accordingly, it is possible to easily increase a content target scope.

FIG. 1 is a diagram illustrating a relationship among users associated with a service release information platform 110 for an IPTV.

The service release information platform 110 for the IPTV may be commonly used by a content provider 120 to provide a content broadcasted by the IPTV, a service provider 130 to manage the content and to provide the content to an end user 150, and a network provider 140. The network provider 140 may provide a network to transmit the content provided by the service provider 130 to the IPTV owned by the end user 150.

Figure 2:
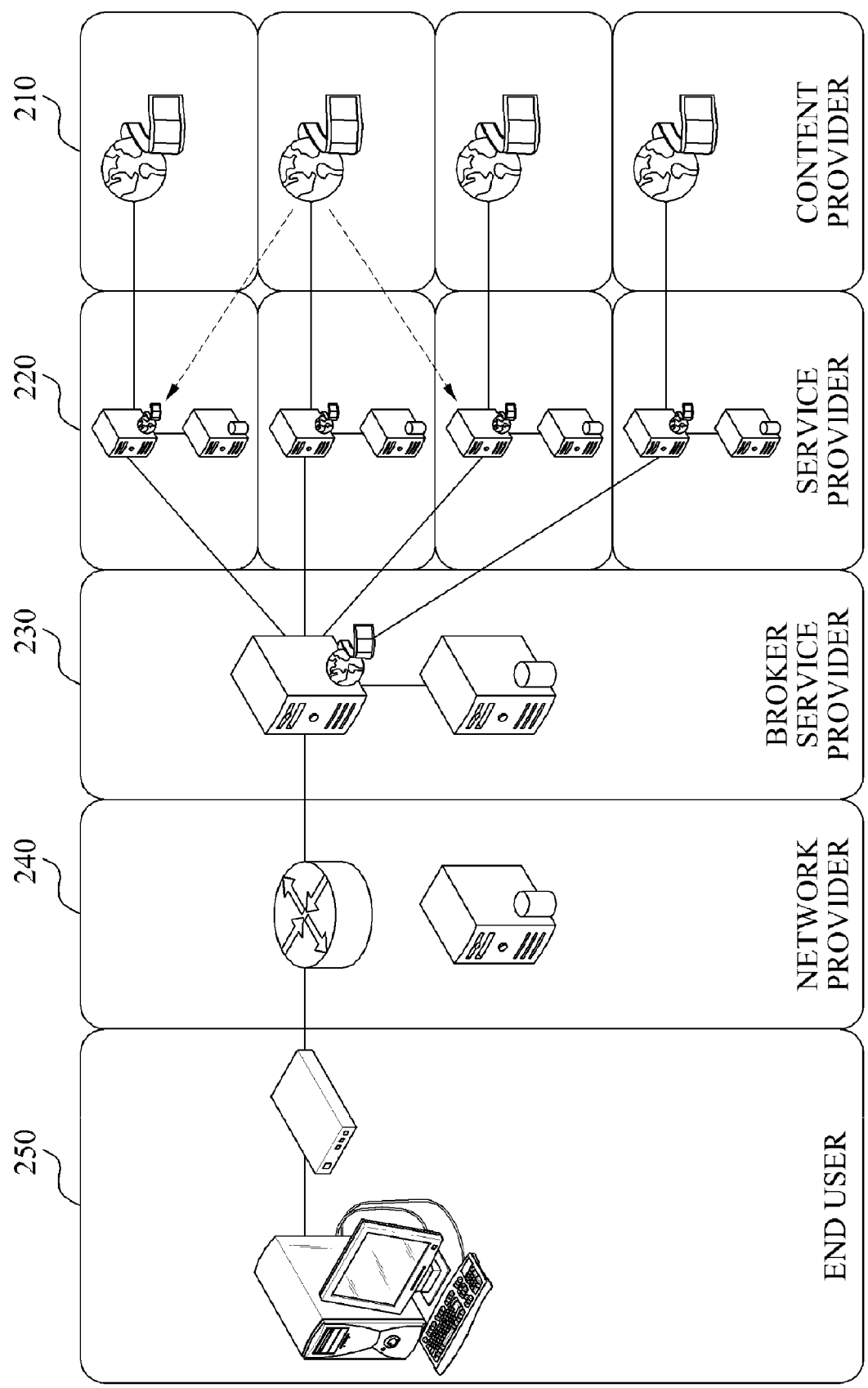
FIG. 2 is a diagram illustrating an example of applying a system of managing various formats of contents according to an embodiment of the present invention.
Figure 3:
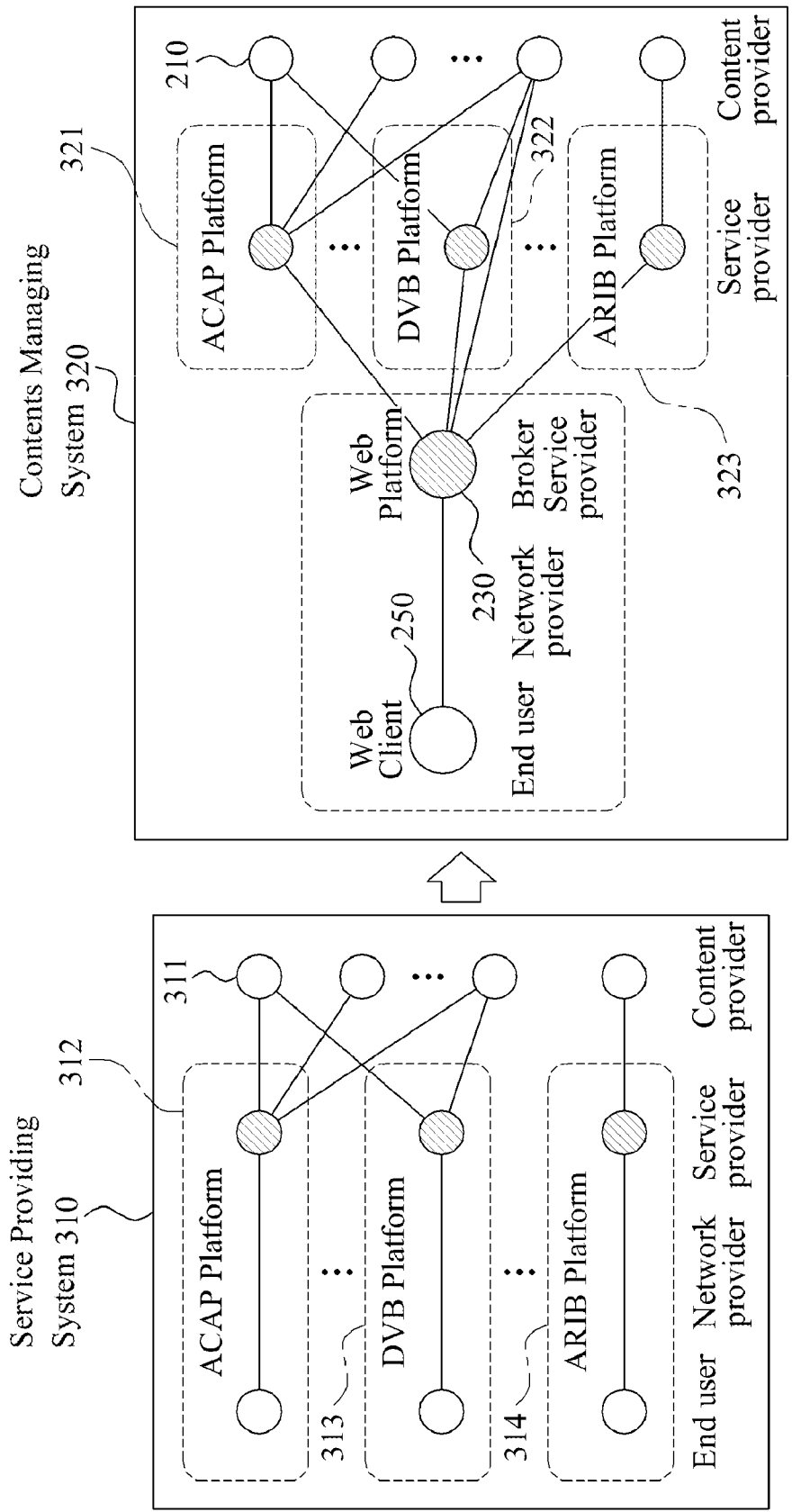
FIG. 3 is a diagram illustrating a comparison between a conventional service providing system and a system of managing various formats of contents according to an embodiment of the present invention.

FIG. 2 is a diagram illustrating an example of applying a system of managing various formats of contents (hereinafter, "contents managing system") according to an embodiment of the present invention. FIG. 3 is a diagram illustrating a comparison between a conventional service providing system 310 and a contents managing system 320 according to an embodiment of the present invention.

As shown in FIG. 2, in the contents managing system, a broker service provider 230 may collectively manage contents of content providers 210 maintained by service providers 220, and may provide contents to an end user 250 over a network provided by a network provider 240.

As shown in FIG. 3, in the conventional service providing system 310, when various content providers 311 provide contents to service providers 312, 313, and 314 using different platforms, each of the service providers 312, 313, and 314 may provide contents to an end user using the same platform as a platform of a corresponding service provider.

For example, an end user using an Application Configuration Access Protocol (ACAP) platform may not receive a content provided using only an Association of Radio Industries and Businesses (ARIB) platform.

In the contents managing system 320 according to an embodiment of the present invention, a broker service provider 230 may upload contents from content providers 210 and service providers 321, 322, and 323 using different platforms, transform the contents to a single platform and then provide the contents to an end user 250. Accordingly, the end user 250 may receive a content provided from a service provider using a platform different from a platform of the end user 250.

In FIG. 3, the broker service provider 230 transforms a content to a web platform that is a most easily accessible environment, and then provides the content to the end user 250.

Also, it is possible to transform an uploaded content to a platform desired by another service provider, and to thereby provide the uploaded content to the other service provider.

Figure 4:
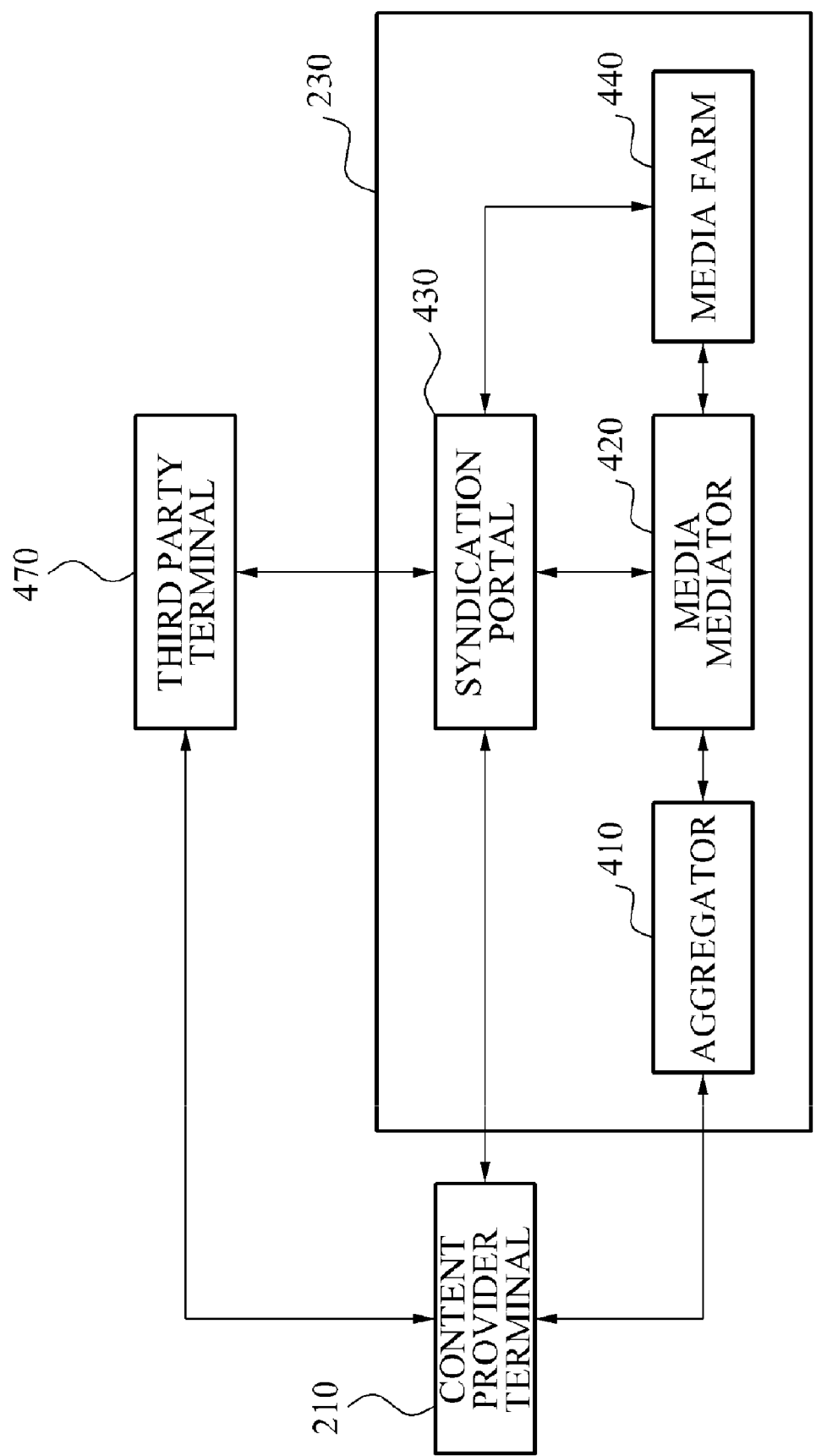
FIG. 4 is a block diagram illustrating a configuration of a system of managing various formats of contents according to an embodiment of the present invention.

FIG. 4 is a block diagram illustrating a configuration of a contents managing system according to an embodiment of the present invention.

As shown in FIG. 4, in the contents managing system, a broker service provider 230 may include an aggregator 410, a media mediator 420, a syndication portal 430, and a media farm 440.

The aggregator 410 may periodically verify whether an added content exists in a feed of a content provider, and upload the added content when the added content exists.

Here, the feed may denote a share-set folder for uploading in a content provider terminal 210, or may denote an address accessible to a site based on address information provided from the syndication portal 430 or to a content provided from the content provider.

The aggregator 410 may verify whether the added content exists only with respect to a published content of the content provider.

A configuration of the aggregator 410 will be further described with reference to FIG. 5.

The media mediator 420 may register the uploaded content, encode the content, and provide the encoded content to an end user or a third party.

The media mediator 420 may exclusively access the content provider terminal 210 to receive the content and metadata of the content from the content provider, register the received content, encode the content, and provide the encoded content to the end user.

A configuration of the media mediator 420 will be further described with reference to FIGS. 6 through 10.

The syndication portal 430 may register a content provider desiring to provide a content in the contents managing system, and may transmit, to the content provider, a Universal Resource Locator (URL) for a feed and a content metadata format to be used for a content creation.

The syndication portal 430 may provide a content transformed to a format used by a third party to the third party that receives the content registered in the contents managing system to provide the received content to an end user using a platform different from a platform of the contents managing system. In this instance, a terminal of the third party receiving the content transformed to the format used by the third party may be referred to as a third party terminal 470.

A configuration of the syndication portal 430 will be further described with reference to FIG. 11.

The media farm 440 may store the uploaded content, and may provide the stored content to the end user according to a control of the media mediator 420.

The media farm 440 may include a web application server to provide an access site of the end user, a file transfer server to transfer a content to the end user, a window media server to execute the content on a website, and a content storage unit to store the content.

Figure 5:
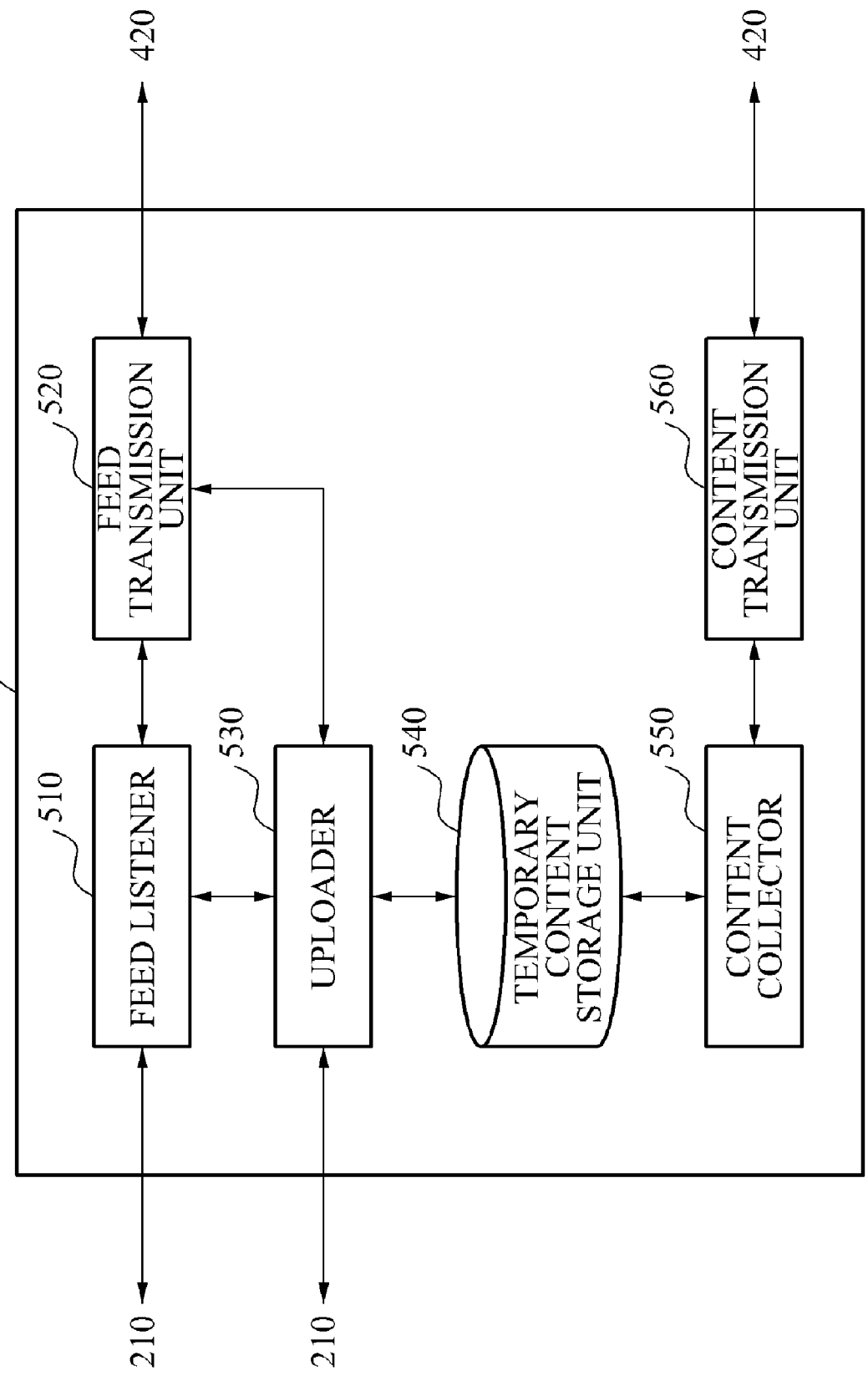
FIG. 5 is a block diagram illustrating a configuration of an aggregator of FIG. 4.

FIG. 5 is a block diagram illustrating a configuration of the aggregator 410 of FIG. 4.

As shown in FIG. 5, the aggregator 410 may include a feed listener 510, a feed transmission unit 520, an uploader 530, a temporary content storage unit 540, a content collector 550, and a content transmission unit 560.

The feed listener 510 may interpret a published format of a content from an original source of the content provider terminal 210 in order to receive the content from the content provider terminal 210.

The feed transmission unit 520 may transmit metadata of the content to the media mediator 420 to be assigned with a unique identifier (ID) with respect to the content, may schedule uploading of the content, and may execute the uploader 530 to upload the content.

The uploader 530 may upload the content from a feed of the content provider terminal 210 and store the uploaded content in the temporary content storage unit 540. The uploader 530 may use, for example, a direct upload Application Programming Interface (API).

The temporary content storage unit 540 may temporarily store the content until the content is transmitted to the media mediator 420.

When contents are temporarily stored in the temporary content storage unit 540 by an operation of the aggregator 410, the content collector 550 may collect at least one content stored in the temporary content storage unit 540.

The content transmission unit 560 may transmit the collected at least one content to the media mediator 420.

Describing an operation of the aggregator 410 in detail, when the feed listener 510 receives metadata of the content from the feed of the content provider terminal 210, the feed transmission unit 520 may analyze the metadata to register an uploader ID for identifying the content provider providing the content, and may request the media mediator 420 for a content unique ID for identifying the content.

The feed transmission unit 520 may transmit the metadata to the media mediator 420, and upload the content from the feed of the content provider terminal 210 to the uploader 530, and may store the uploaded content in the temporary content storage unit 540.

When the feed transmission unit 520 receives the content unique ID from the media mediator 420, the content collector 550 may collect a corresponding content stored in the temporary content storage unit 540, and the content transmission unit 560 may transmit the collected content to the media mediator 420.

Figure 6:
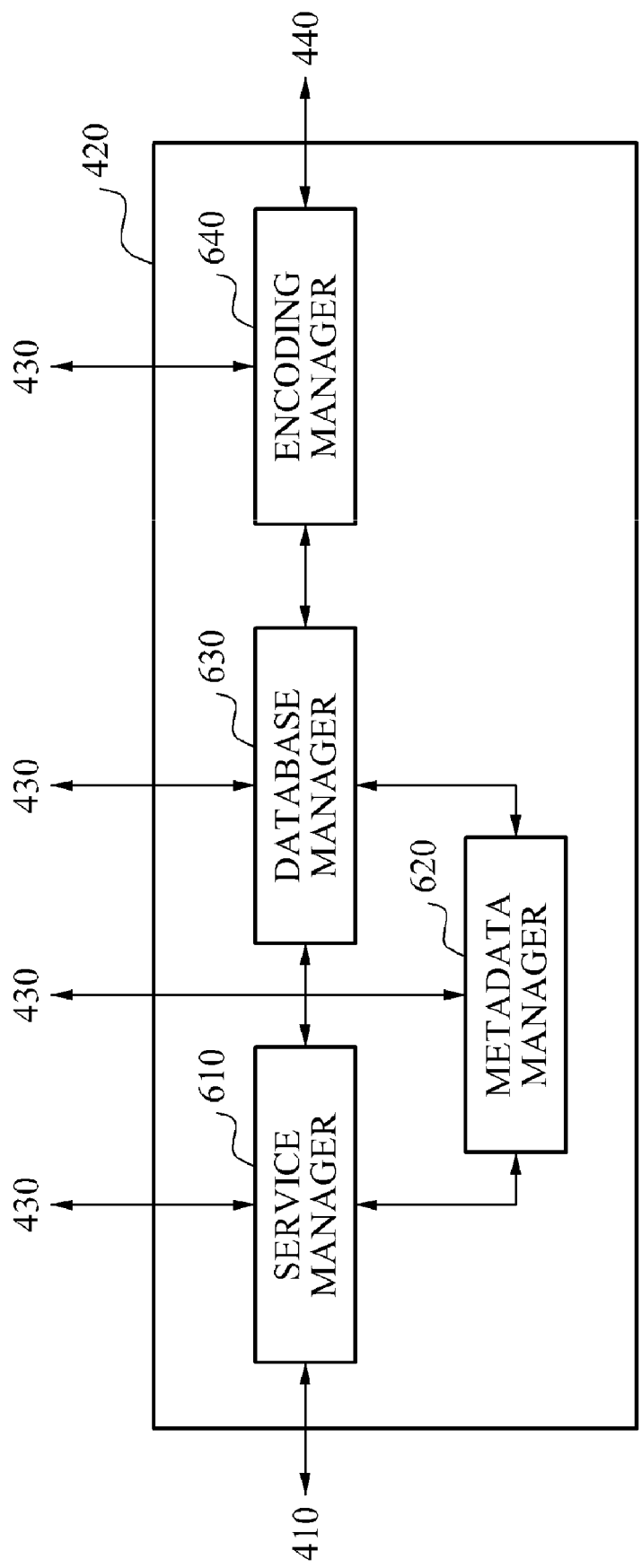
FIG. 6 is a block diagram illustrating a configuration of a media mediator of FIG. 4.

FIG. 6 is a block diagram illustrating a configuration of the media mediator 420 of FIG. 4.

As shown in FIG. 6, the media mediator 420 may include a service manager 610, a metadata manager 620, a database manager 630, and an encoding manager 640.

The serving manager 610 may receive a content from the aggregator 410, and request another constituent component such as the metadata manager 620, the database manager 630, and the encoding manager 640 for operations associated with the content.

A configuration of the service manager 610 will be further described with reference to FIG. 7.

The metadata manager 620 may generate a unique ID from metadata of the content, register the unique ID to the syndication portal 430, transmit the unique ID to the aggregator 410, and transform the metadata to a schema suitable for a contents managing system, and store the transformed metadata.

A configuration of the metadata manager 620 will be further described with reference to FIG. 8.

The database manager 630 may store and manage information associated with the content.

A configuration of the database manager 630 will be further described with reference to FIG. 9.

The encoding manager 640 may schedule an encoding sequence of the content, and sequentially encode the content into a format corresponding to the contents managing system.

A configuration of the encoding manager 640 will be further described with reference to FIG. 10.

Figure 7:
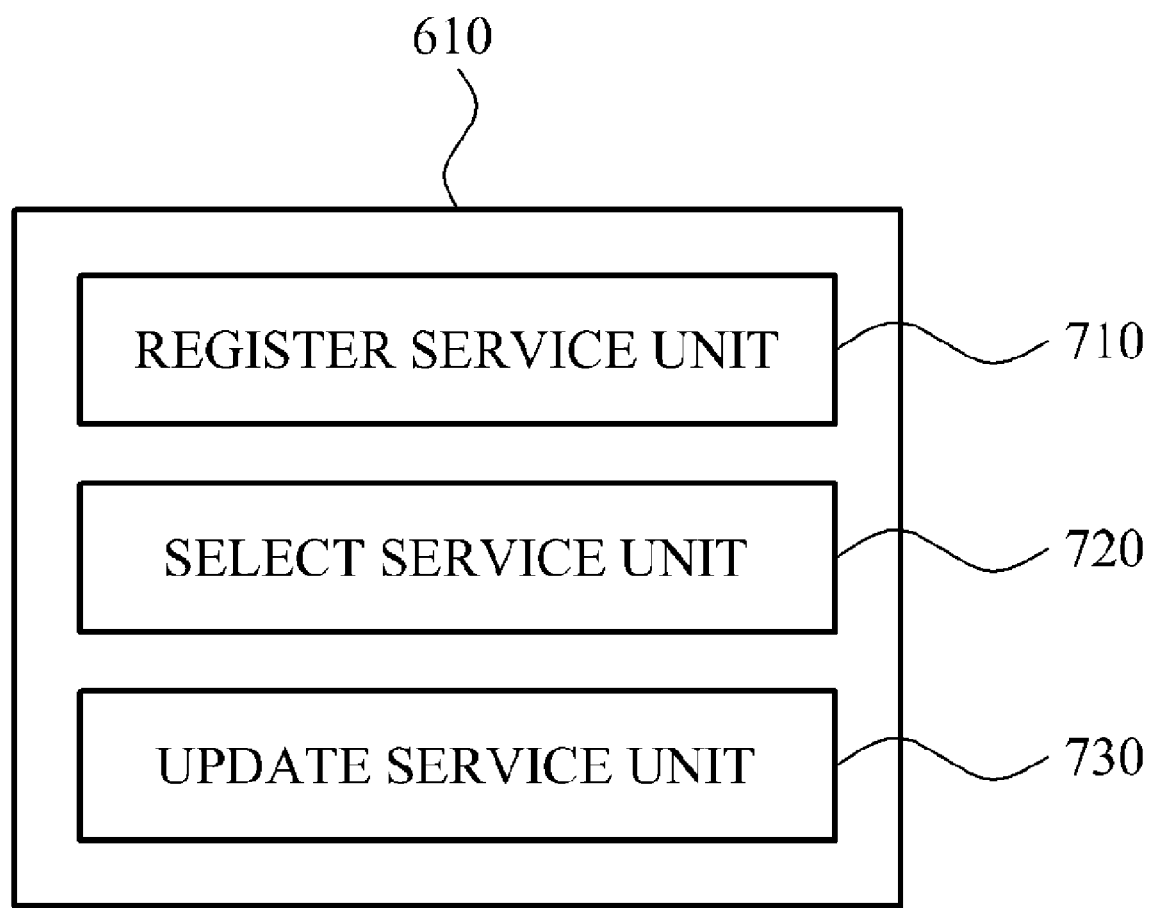
FIG. 7 is a block diagram illustrating a configuration of a service manager of FIG. 6.

FIG. 7 is a block diagram illustrating a configuration of the service manager 610 of FIG. 6.

As shown in FIG. 7, the service manager 610 may include a register service unit 710, a select service unit 720, and an update service unit 730.

The register service unit 710 may sequentially control configurations required during a process of registering a content uploaded from a feed. Also, the register service unit 710 may control a process of registering the content received from the content provider.

The select service unit 720 may sequentially control configurations required during a process of transforming metadata of the content to a format employed by the contents managing system, and using the transformed metadata in a service.

When a request for modifying the metadata of the content is received from the syndication portal 430, the update service unit 730 may modify the metadata of the content stored in the database manager 630.

Figure 8:
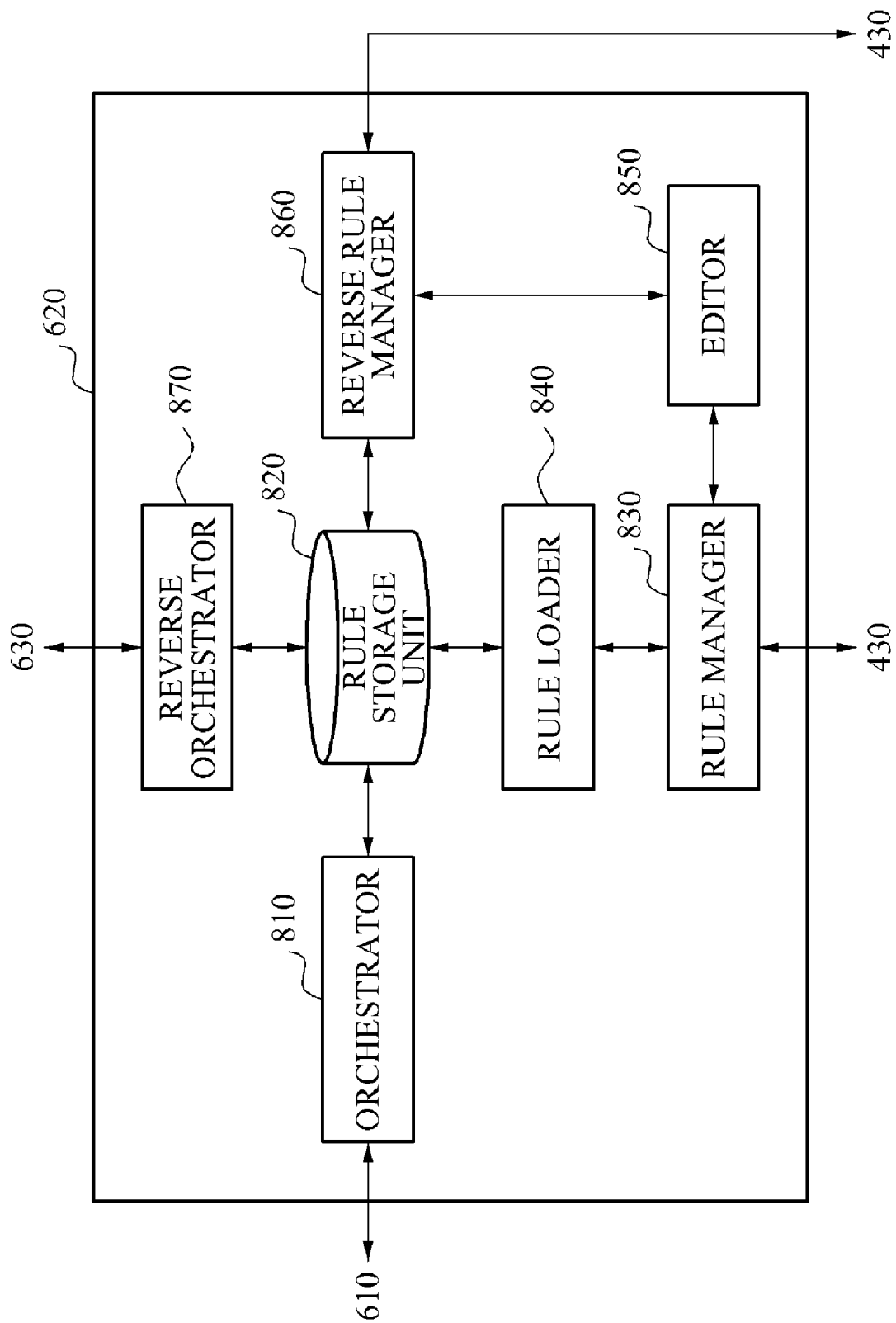
FIG. 8 is a block diagram illustrating a configuration of a metadata manager of FIG. 6.

FIG. 8 is a block diagram illustrating a configuration of the metadata manager 620 of FIG. 6.

As shown in FIG. 8, the metadata manager 620 may include an orchestrator 810, a rule storage unit 820, a rule manager 830, a rule loader 840, an editor 850, a reverse rule manager 860, and a reverse orchestrator 870.

The orchestrator 810 may orchestrate metadata of a content based on a rule stored in the rule storage unit 820.

The rule storage unit 820 may store a rule set by a content provider or a third party. The rule may include information associated with a particular standard and a format or a platform of the content used by the content provider or the third party, and a metadata format of the content.

The rule manager 830 may transmit a particular condition to the rule loader 840 according to a request of the syndication portion 430 so that the rule loader 840 may retrieve an edition target rule satisfying the particular condition, and may transmit the edition target rule to the editor 850.

The rule loader 840 may retrieve, from the rule storage unit 820, a rule satisfying the particular condition, and may transmit the retrieved rule to the rule manager 830.

The editor 850 may execute a jamper to edit the edition target rule according to a request of the third party connected to the syndication portal 430 or to the media mediator 420.

The reverse rule manager 860 may receive the edited rule from the editor 850, and transmit the edited rule to the rule storage unit 820 and syndication portal 430 to store the edited rule.

The reverse orchestrator 870 may orchestrate metadata of the content based on the edited rule.

Figure 9:
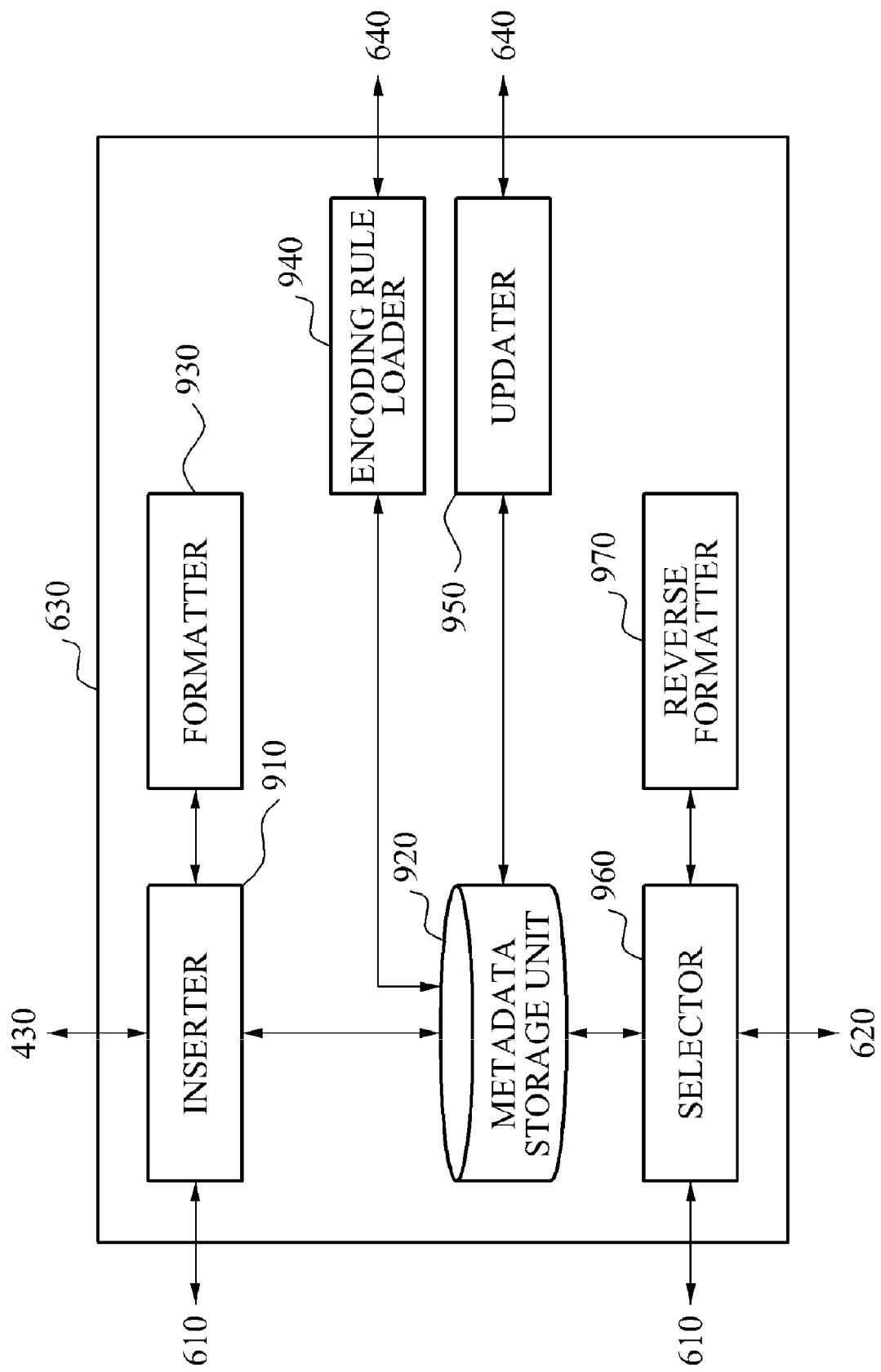
FIG. 9 is a block diagram illustrating a configuration of a database manager of FIG. 6.

FIG. 9 is a block diagram illustrating a configuration of the database manager 630 of FIG. 6.

As shown in FIG. 9, the database manager 630 may include an inserter 910, a metadata storage unit 920, a formatter 930, an encoding rule loader 940, an updater 950, a selector 960, and a reverse formatter 970.

The inserter 910 may receive orchestrated metadata of a content from the service manager 610, store the orchestrated metadata of the content in the metadata storage unit 920, and request the syndication portal 430 to register the content containing the orchestrated metadata.

The metadata storage unit 920 may store metadata of the content and information associated with the content.

Information associated with the content may include at least one of a Uniform Resource Identifier (URI) string for identifying the content, basic content information including a content title or a content creator, information associated with a marker indicated at a play point when the content corresponds to a media content, information regarding a content credit and a plurality of media link addresses. The metadata of the content may include an encoding rule to encode the content.

The formatter 930 may transform the orchestrated metadata to a method schema used in the metadata storage unit 920. The method schema may include, for example, a Structured Query Language (SQL) query string.

The encoding rule loader 940 may extract the encoding rule from the stored metadata to provide the extracted encoding rule to the encoding manager 640.

The updater 950 may update, to the metadata storage unit 620, an access path to the encoded content and an access path to a thumbnail extracted from the content.

The selector 960 may retrieve metadata of the content from the metadata storage unit 920 according to a request of the service manager 610, transmit the retrieved metadata to the reverse formatter 970 to transform the metadata, and may request the metadata manager 620 for reverse orchestrating of the metadata.

The reverse formatter 970 may transform the metadata of the content to an Extensible Markup Language (XML) format managed by the syndication portal 430.

Figure 10:
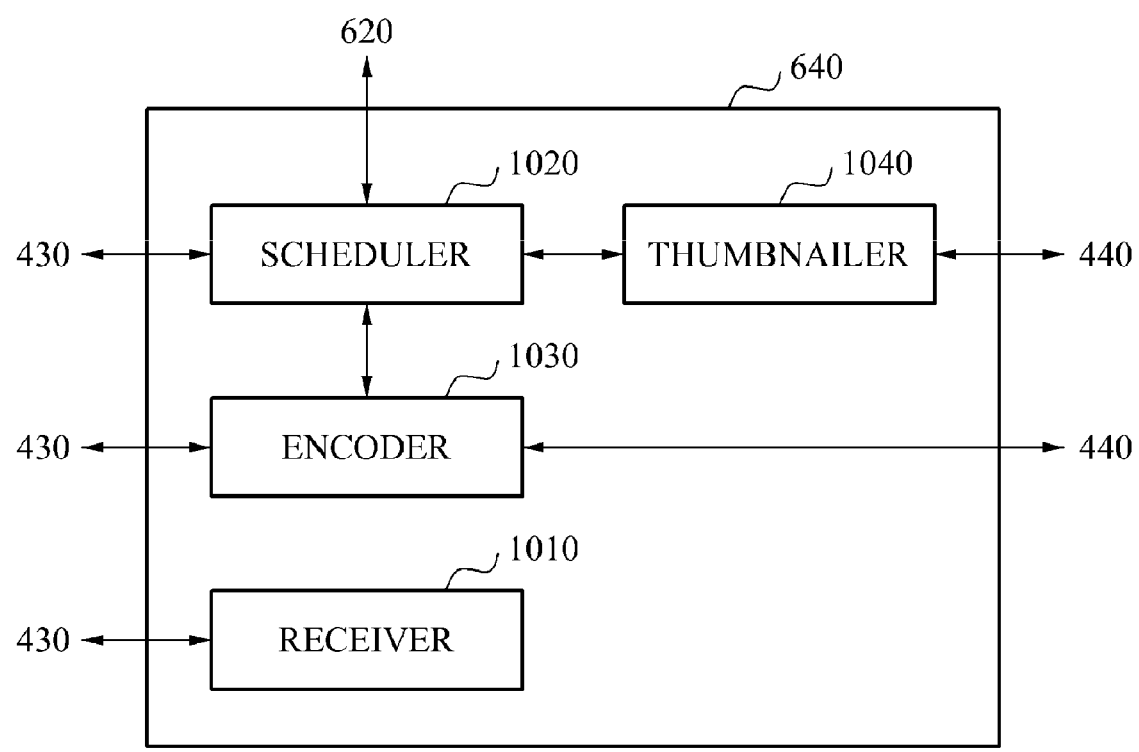
FIG. 10 is a block diagram illustrating a configuration of an encoding manager of FIG. 6.

FIG. 10 is a block diagram illustrating a configuration of the encoding manager 640 of FIG. 6.

As shown in FIG. 10, the encoding manager 640 may include a receiver 1010, a scheduler 1020, an encoder 1030, and a thumbnailer 1040.

The receiver 1010 may periodically receive, from the syndication portal 430, a content list uploaded by the aggregator 410, and change content status information included in the received content list to "received".

The content status information included in the content list may be stored in the syndication portal 430.

When the media mediator 420 is exclusively used, the content status information may be stored in the database manager 630. Accordingly, when the media mediator 420 is exclusively used and the content status information needs to be changed, the content status information stored in the database manager 630 may be changed instead of changing the content status information stored in the syndication portal 430.

In this instance, the receiver 1010 may periodically verify a content list received from the content provider, stored in the database manager 630, and may change, to "received", content status information included in the verified content list.

The scheduler 1020 may periodically receive, from the syndication portal 430, a list of contents that are in a "received" status, and receive, from the metadata manager 620, a rule to encode the contents being in the received status, and transmit the encoded contents and the rule to the encoder 1030 to request the encoder 103 for encoding of the content being in the received status.

The scheduler 1020 may transmit, to the thumbnailer 1040, the contents being in the received status to extract a thumbnail.

The scheduler 1020 may also transmit, to the updater 950, an access path to the encoded contents and an access path to the extracted thumbnail.

The encoder 1030 may receive, from the scheduler 1020, the contents being in the received status and the rule to encode the contents, and encode the contents based on the received rule. When encoding is completed, the encoder 1030 may change the content status information to "encoding complete".

The thumbnailer 1040 may receive, from the scheduler 1020, the contents being in the received status, and extract the thumbnail from the contents.

Figure 11:
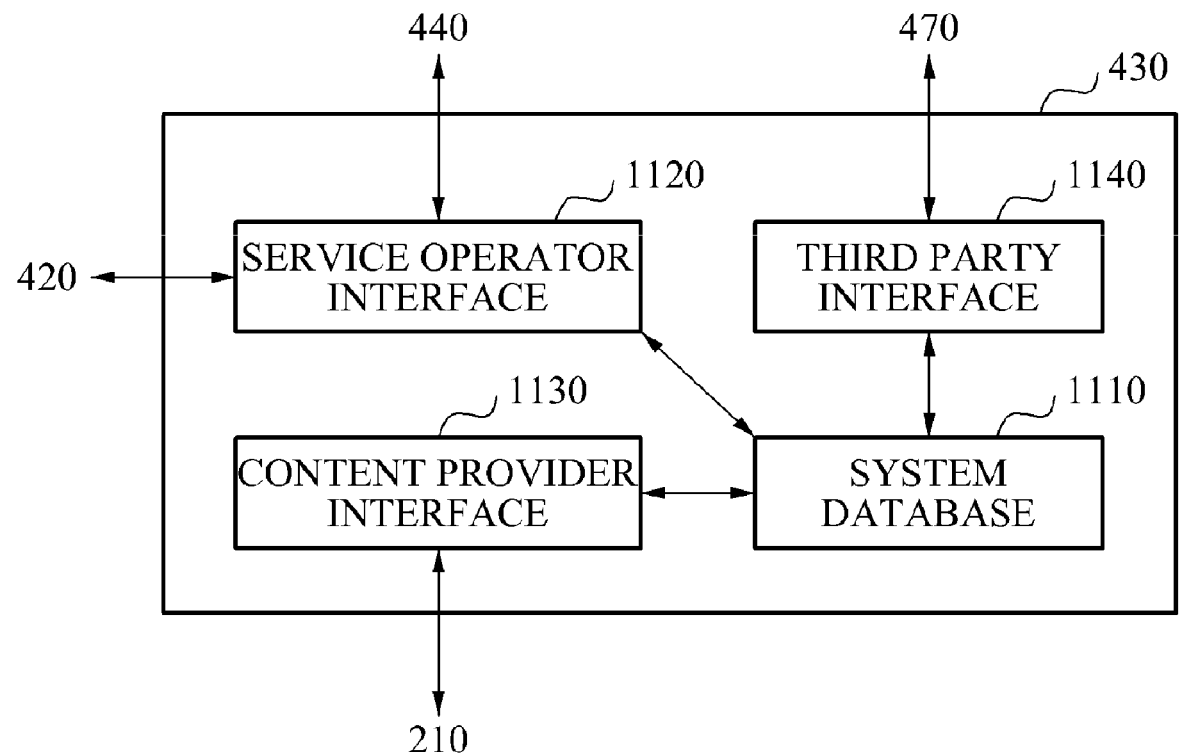
FIG. 11 is a block diagram illustrating a configuration of a syndication portal of FIG. 4.

FIG. 11 is a block diagram illustrating a configuration of the syndication portal 430.

As shown in FIG. 11, the syndication portal 430 may include a system database 1110, a service operator interface 1120, a content provider interface 1130, and a third party interface 1140.

The system database 1110 may store content status information, feed information, content provider information, third party information, end user information receiving the content, and content use status information.

The content status information may include at least one of a URI string for identifying the content, basic content information including a content title and a content creator, information associated with a marker indicated at a play point when the content corresponds to a media content, information regarding a content credit, a plurality of media link addresses of the link, and a right to the content, and information associated with a content price or a contract.

The content provider information, the third party information, and the end user information may include at least one of an ID, a password, a name, a height, a language, and a subscribed date with respect to a target user, and ID information indicating which one the target user belongs among the content provider, the third party, and the end user.

The feed information may include at least one of an ID of a content provider owning a corresponding feed, ID information of the feed, initial address information of a metadata list of a content created by the content provider, and status information of the feed.

The system database 1110 may further store information associated with events having a possibility of occurring in the syndication portal 430, information associated with an event solution scheme, and information associated with a type of the content provided for the end user and a provided time.

The service operator interface 1120 may manage content status information and content provider information, and may register the content provider, the third party, and the end user.

The service operator interface 1120 may identify an end user connected to the contents managing system, based on an ID of the end user, and may recommend a content suitable for the end user based on types of contents provided for the user and provided times.

The service operator interface 1120 may include a feed upload managing function of the content provider, and may utilize a block function by referring to the contents.

The service operator interface 1120 may manage information, alarms, and events occurring in a constituent component different from the syndication portal 430.

The content provider interface 1130 may provide the content provider with an upload status, an issue status, and a use status with respect to a content desired by the content provider.

The third party interface 1140 may provide information associated with the content registered to the third party holding the third party terminal 470, and may transform and provide a format of the registered content according to a request of the third party.

Figure 12:
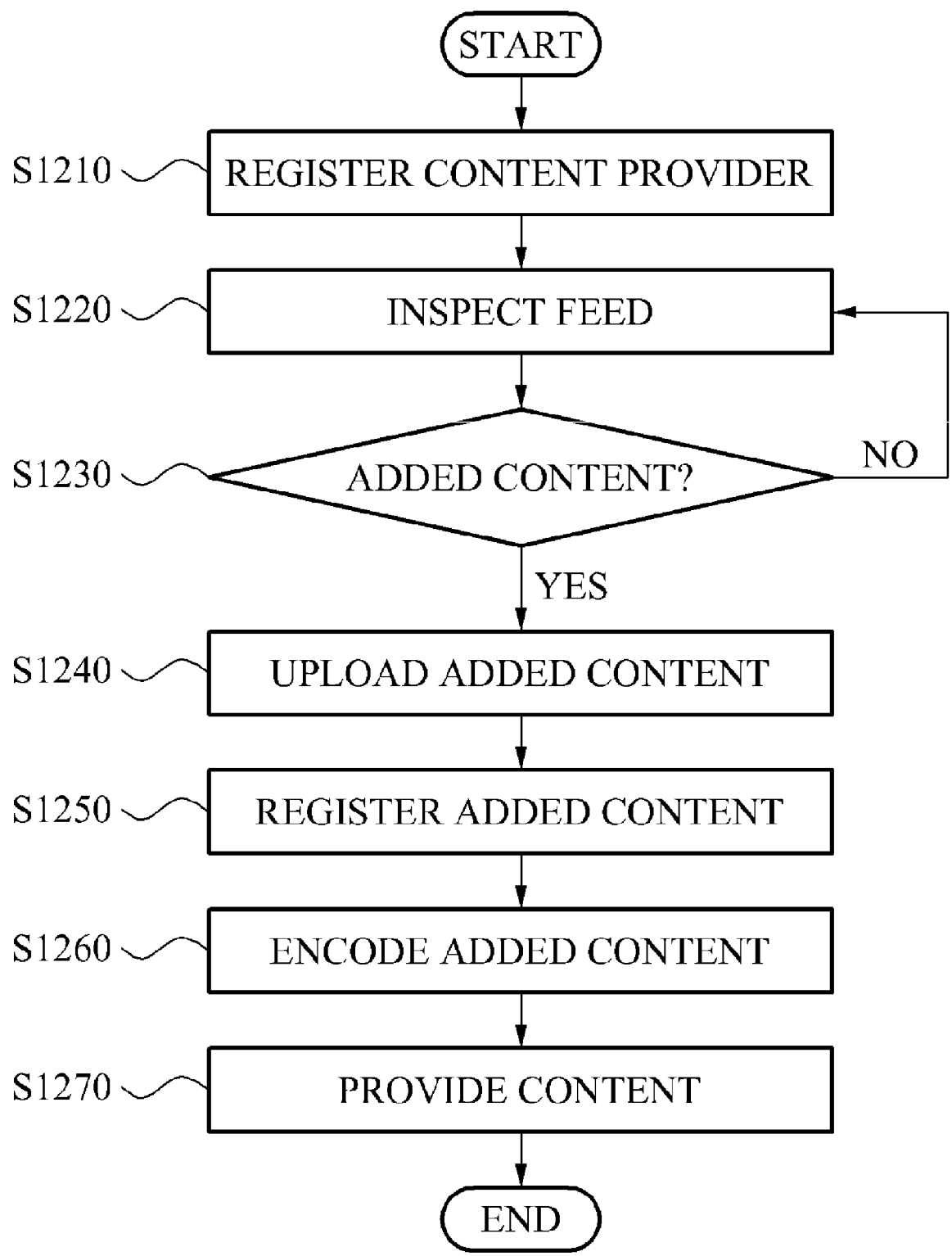
FIG. 12 is a flowchart illustrating a method of managing various formats of contents according to an embodiment of the present invention.

FIG. 12 is a flowchart illustrating a method of managing various formats of contents according to an embodiment of the present invention.

In operation S1210, the syndication portal 430 may register a content provider desiring to provide a content according to a request of the content provider.

In this instance, the syndication portal 430 may transmit, to the content provider, a URL for a feed and a metadata format to be used for content creation.

The content provider registration process will be further described with reference to FIG. 13.

In operation S1220, the aggregator 410 may periodically inspect a feed of each of registered content providers.

In operation S1230, the aggregator 410 may verify whether an added content exists in the inspected feed. When the added content does not exist in operation S1230, the aggregator 410 may repeat operation S1220.

Conversely, when the added content exists in operation S1230, the aggregator 410 may upload the added content from the feed, and request the media mediator 420 to register the added content in operation S1240.

The content verifying and uploading process corresponding to operations S1220 through S1240 will be further described with reference to FIG. 14.

In operation S1250, the media mediator 420 may register the requested added content.

The content registration process will be further described with reference to FIG. 15.

In operation S1260, the media mediator 420 may encode the registered added content to a format suitable for the contents managing system.

The encoding process will be further described with reference to FIG. 16.

In operation S1270, the media mediator 420 may provide the encoded content to an end user or a third party.

In this instance, the media mediator 420 may transform the encoded content to a format set by the end user or the third party, and thereby provide the transformed content.

The format setting process will be further described with reference to FIG. 17, and the encoded content changing and providing process will be further described with reference to FIG. 18.

Figure 13:
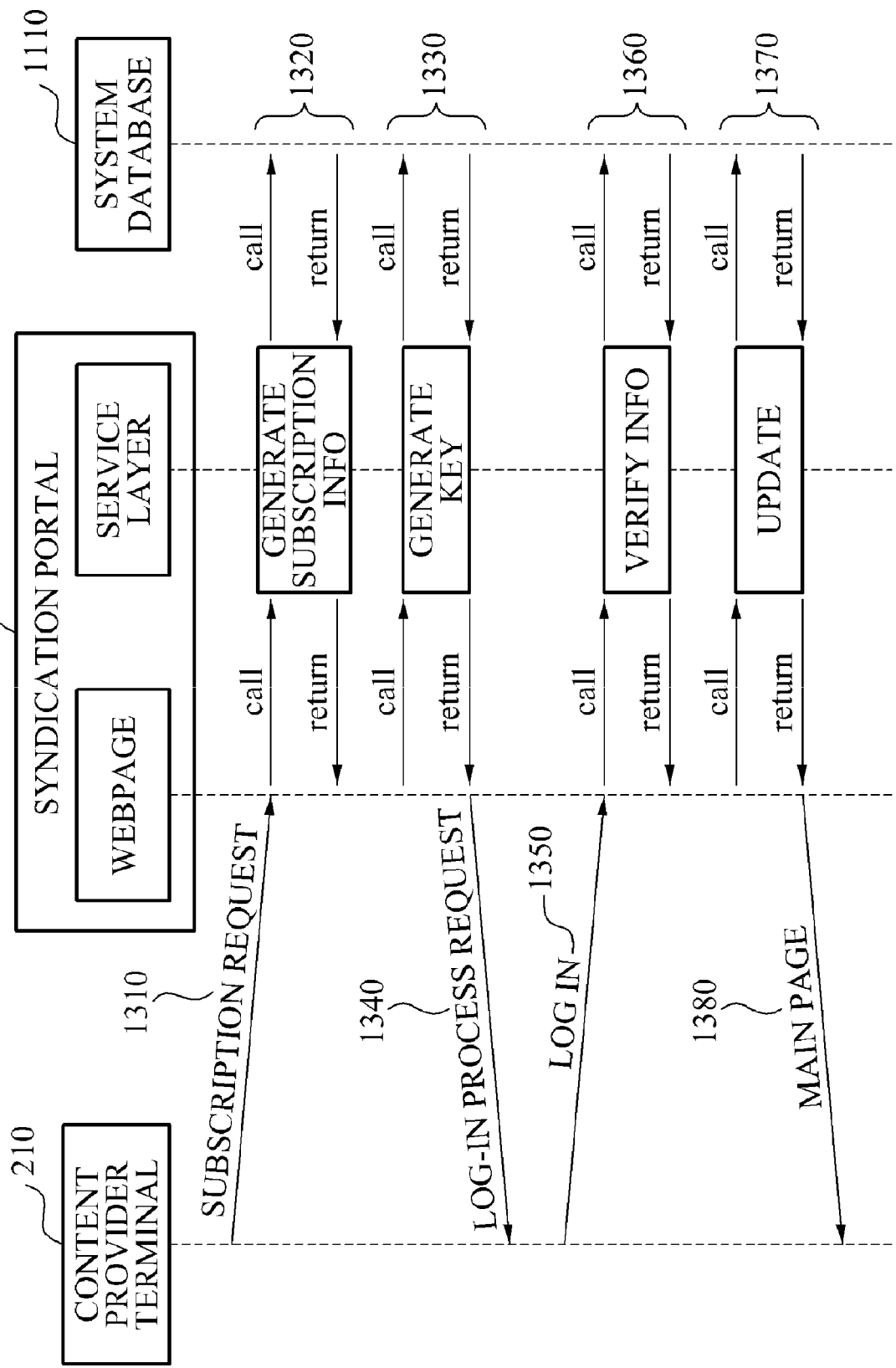
FIG. 13 is a diagram illustrating a process of registering a content provider according to an embodiment of the present invention.

FIG. 13 is a diagram illustrating a process of registering a content provider according to an embodiment of the present invention.

When the syndication portal 430 receives a subscription request signal from the content provider terminal 210 in operation 1310, the syndication portal 430 may generate an ID and a password of the content provider based on the subscription request signal, and may store the ID and the password in the media farm 440 in operation 1320. In this instance, the syndication portion 430 may generate subscription information including the ID and the password of the content provider, and information associated with the content provider.

The syndication portal 430 may receive the subscription request signal from the content provider terminal 210 via a webpage provided from the service operator interface 1120. The syndication portal 430 may generate the subscription information using a service layer containing the system database 1110 and the service operator interface 1120.

In operation 1330, the syndication portal 430 may generate a key corresponding to the ID and the password of the content provider. In operation 1340, the syndication portal 430 may transmit the ID and the password of the content provider and the key to request an execution of a log-in process.

In this instance, the syndication portal 430 may generate a corresponding key based on the ID of the content provider and a current time, and may store the generated key in the system database 1110. When a particular situation occurs while generating the key, the syndication portal 430 may process the particular situation by transmitting and receiving information to and from the system database 1110.

When the content provider attempts to log in the content in operation 1350, the syndication portal 430 may compare an ID and a password received from the content provider terminal 210 with the ID and the password stored in the system database 1110, and verify the information in operation 1360, and may provide the content provider with a main page to utilize the service operator interface 1120 or the content provider interface 1130 in operation 1380.

In this instance, the syndication portal 430 may verify information changed in the system database 110 and update the information in operation 1370, and then may provide the content provider with the main page.

Figure 14:
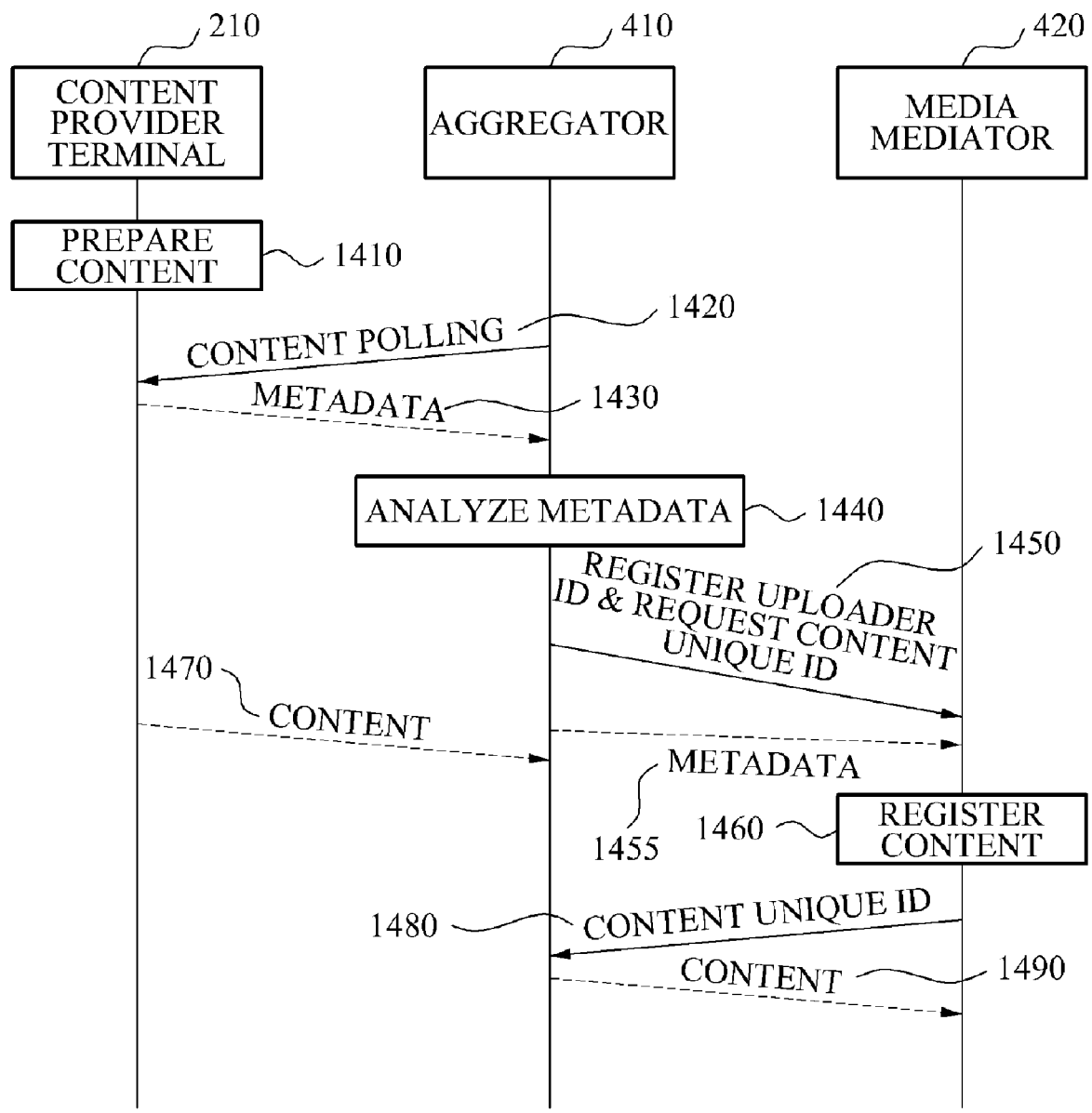
FIG. 14 is a diagram illustrating a process of verifying and uploading a content according to an embodiment of the present invention.

FIG. 14 is a diagram illustrating a process of verifying and uploading a content according to an embodiment of the present invention.

In operation 1410, a content may be prepared in a feed of the content provider terminal 210. In this state, when the aggregator 410 attempts content polling with respect to address information of the feed, the aggregator 410 may detect the content in operation 1420.

In operation 1430, the aggregator 410 may upload metadata of the content from the feed of the content provider terminal 210. The aggregator 410 may analyze the uploaded metadata to obtain address information of the content and content information in operation 1440.

In operation 1450, the aggregator 410 may register, to the media mediator 420, an uploader ID for identifying the content provider providing the content, and may request the media mediator 420 for a content unique ID for identifying the content.

In operation 1455, the aggregator 410 may transmit uploaded metadata to the media mediator 420.

In operation 1460, the media mediator 420 may receive the metadata to register the content.

In operation 1470, the aggregator 410 may upload the content from the feed of the content provider terminal 210.

In operation 1480, the media mediator 420 may transmit, to the aggregator 410, the content unique ID generated during a content registration process.

In operation 1490, the aggregator 410 receiving the content unique ID may transmit the content to the media mediator 420, periodically perform polling with respect to the feed of the content provider terminal 210, and transmit collected contents to the media mediator 420.

Figure 15:
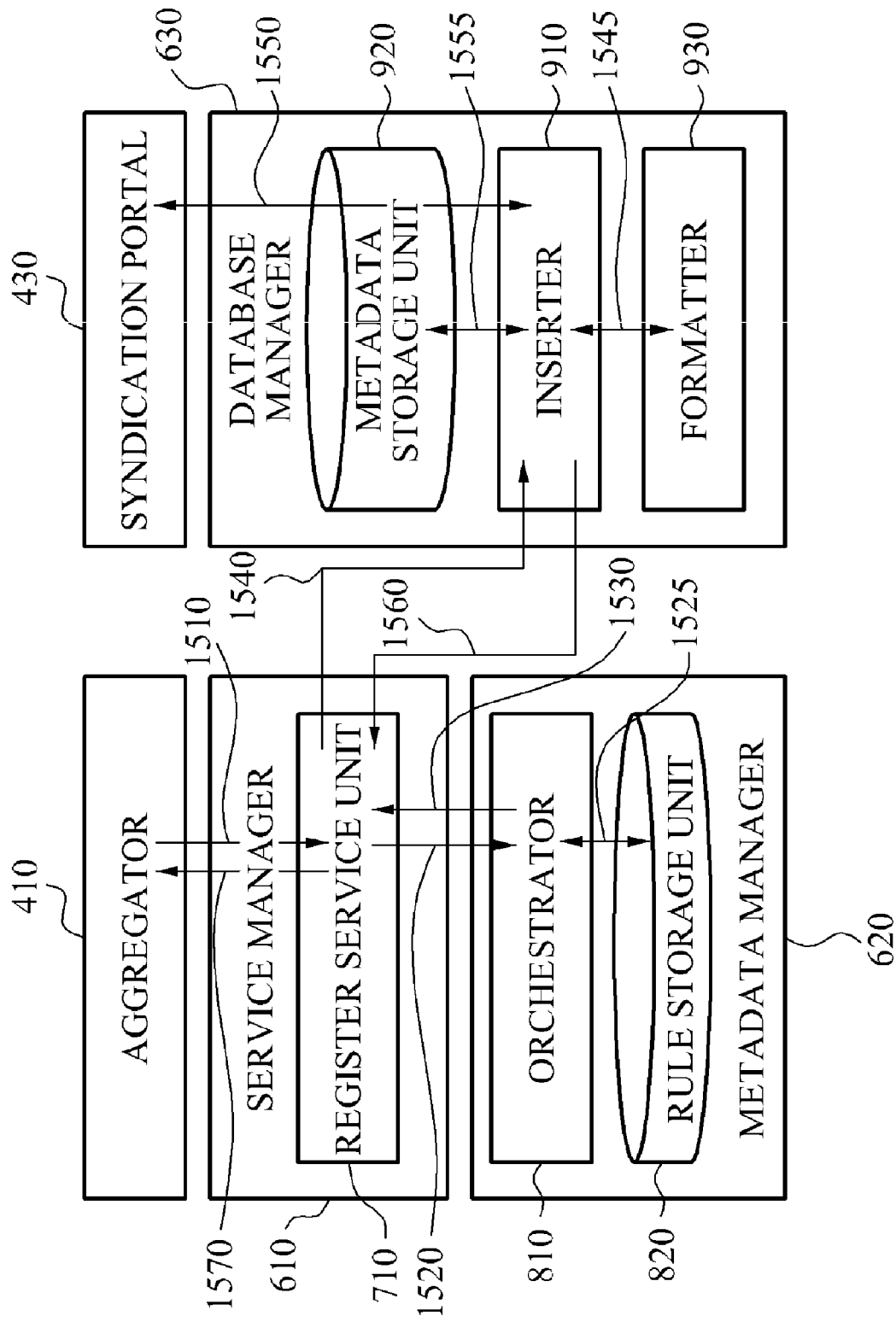
FIG. 15 is a diagram illustrating a process of registering a content according to an embodiment of the present invention.

FIG. 15 is a diagram illustrating a process of registering a content according to an embodiment of the present invention.

When the aggregator 410 transmits the content, uploaded in operation S1250, to the service manager 610 of the media mediator 420 (1510), the register service unit 710 of the service manager 610 may request the orchestrator 810 of the metadata manager 620 to transform metadata of the content (1520). In this instance, the orchestrator 810 may transform a format of the metadata to a format used in the contents managing system, for example, to a cans_rss format.

The orchestrator 810 may retrieve, from the rule storage unit 820 according to a request of the register service unit 710, a rule to transform metadata of the content provider providing the content (1525). The orchestrator 810 may orchestrate the metadata of the content based on the retrieved rule (1530).

Specifically, the orchestrator 810 may orchestrate an XML of the metadata to an XML format used in a web-base IPTV middleware, and may transmit the orchestrated metadata to the register service unit 710.

The register service unit 710 may transmit the orchestrated metadata to the inserter 910 of the database manager 630 to request a content registration (1540).

The inserter 910 may transmit the orchestrated metadata to the formatter 930 to transform the orchestrated metadata to a method schema used in the metadata storage unit 920 (1545).

The inserter 910 may transmit the content containing the orchestrated metadata to the syndication portal 430 to register the content (1550). The inserter 910 may store the orchestrated metadata in the metadata storage unit 920 (1555).

When the inserter 910 transmits, to the register service unit 710, a content list managing registered contents (1560), the register service unit 710 may return the received content list to the aggregator 410 (1570).

Figure 16:
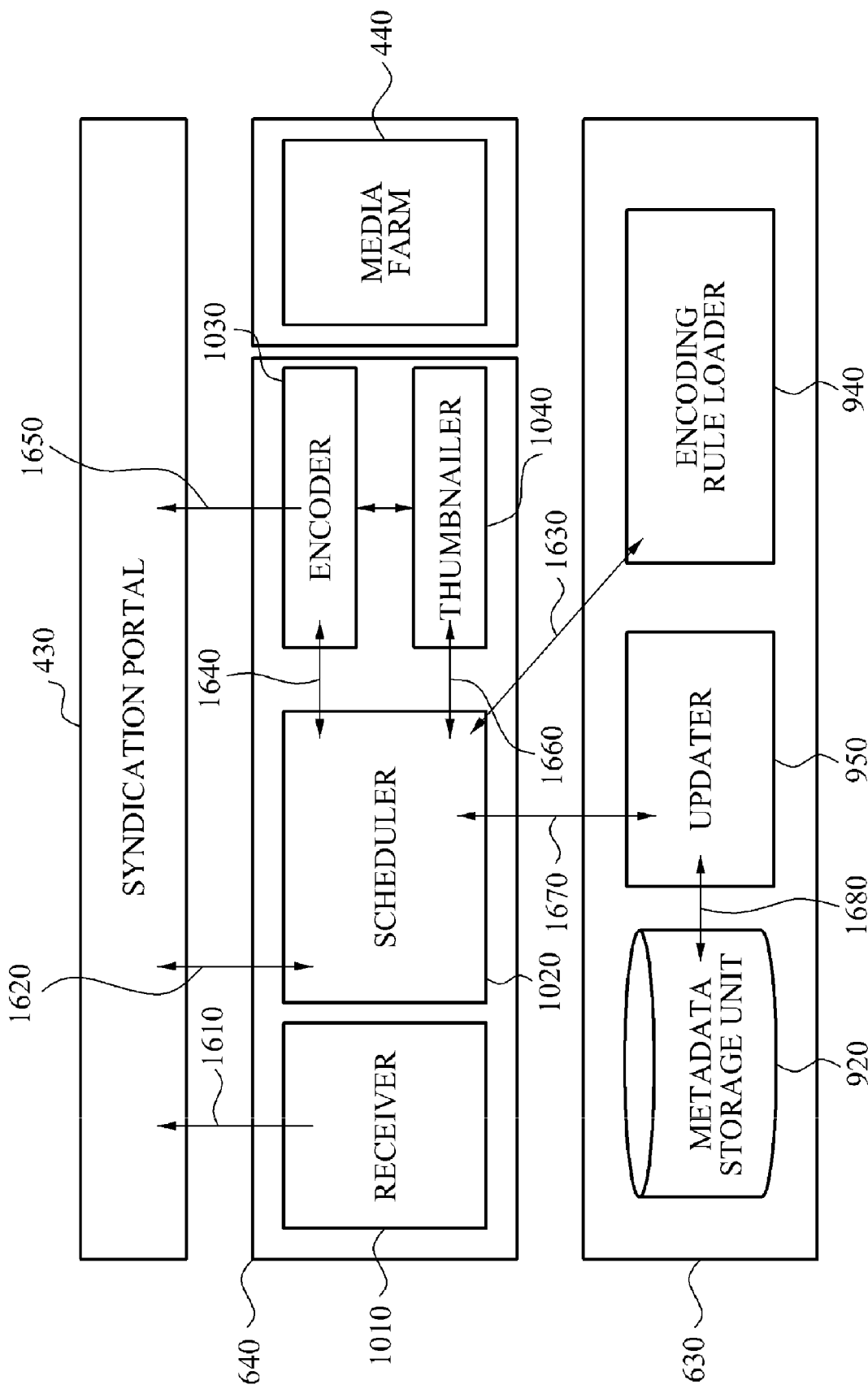
FIG. 16 is diagram illustrating an encoding process according to an embodiment of the present invention.

FIG. 16 is diagram illustrating an encoding process according to an embodiment of the present invention.

The encoding manager 640 may share contents with the media farm 440 using a network file system. The encoder 1030 and the thumbnailer 1040 may access contents stored in the media farm 440 without restrictions.

The receiver 1010 may periodically receive, from the syndication portal 430, a list of contents uploaded by the aggregator 410, and may change content status information included in the content list to "received" (1610).

The scheduler 1020 may periodically receive, from the syndication portal 430, a list of contents being in a received status to determine an encoding sequence, and change content status information of a content to be encoded to "encoding" (1620).

The scheduler 1020 may request the encoding rule loader 940 for an encoding rule, and the encoding rule loader 940 may extract, from content metadata, an encoding rule corresponding to the content being in the received status, and may provide the extracted encoding rule to the scheduler 1020 (1630).

The scheduler 1020 may transmit the content being in the received status and the encoding rule to the encoder 1030 to request an encoding (1640).

In this instance, the encoder 1030 may encode the received content being in the received status, based on the encoding rule. When encoding is completed, the encoder 1030 may transmit the encoded content to the scheduler 1020. Also, the encoder 1030 may provide an encoding progress rate to the syndication portal 430 periodically during the encoding process (1650).

For example, the encoder 1030 may encode the content being in the received status using FFMpeg.

The scheduler 1020 may transmit the content being in the received status to the thumbnailer 1040 to request the thumbnailer 1040 for extracting a thumbnail (1660).

In this instance, the thumbnailer 1040 may extract the thumbnail from the content being in the received status using FFMpeg, and transmit the extracted thumbnail to the scheduler 1020.

The scheduler 1020 may transmit, to the updater 950, an access path to the encoded content and an access path to the extracted thumbnail (1670).

The updater 950 may update, to the metadata storage unit 920, the access path to the encoded content and the access path to the extracted thumbnail (1680).

Figure 17:
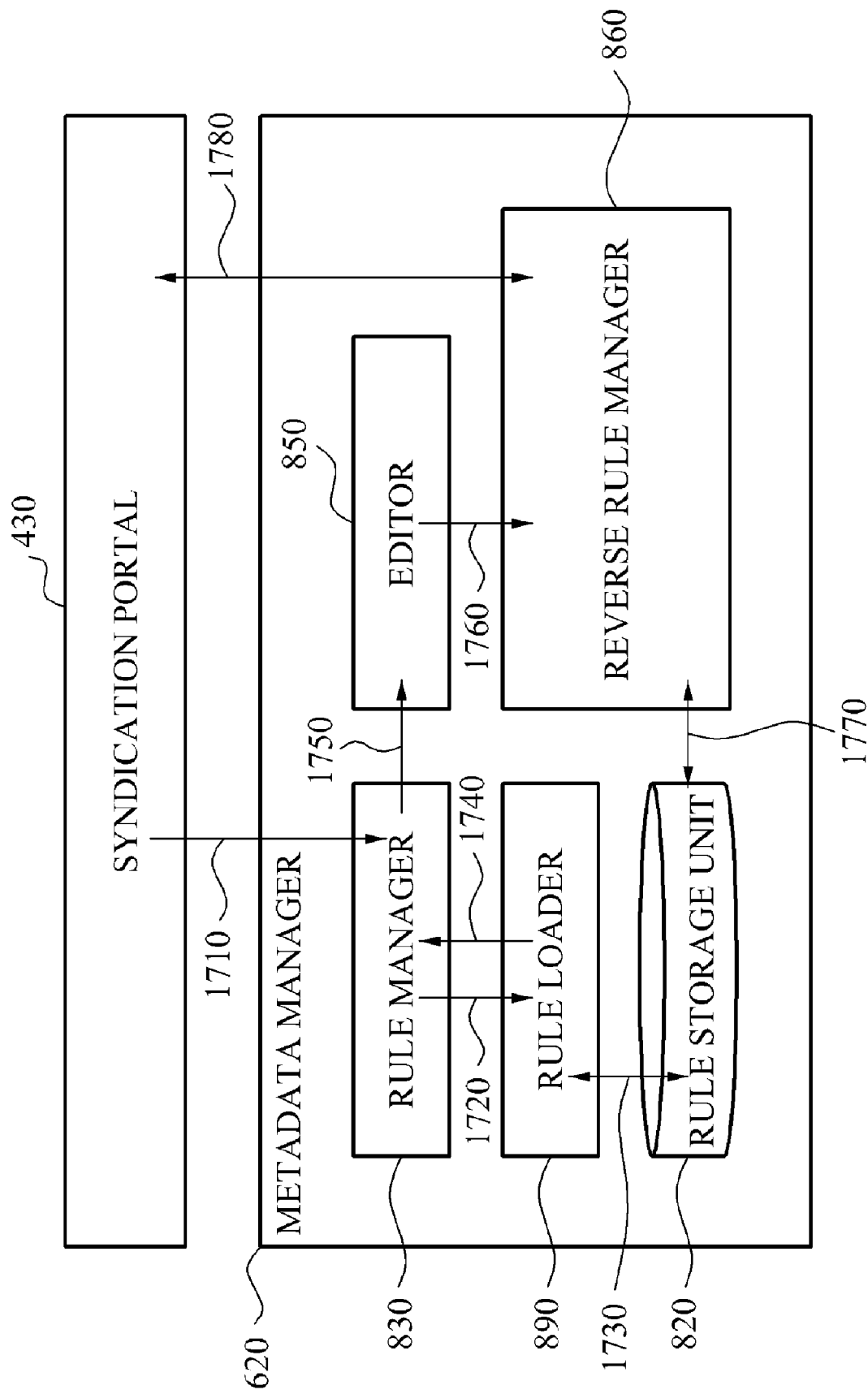
FIG. 17 is a diagram illustrating a process of setting, by an end user or a third party, a format according to an embodiment of the present invention.

FIG. 17 is a diagram illustrating a process of setting, by an end user or a third party, a format according to an embodiment of the present invention.

When the syndication portal 430 approaches the rule manager 830 of the media mediator 620 to request a format setting according to a request of a content provider (1710), the rule manager 830 may transmit a particular condition to the rule loader 840 according to a request of the syndication portal 430 so that the rule loader 840 may retrieve a rule to be edited, satisfying the particular condition (1720).

The rule loader 840 may retrieve, from the rule storage unit 820, a rule satisfying the particular condition (1730), and may transmit the retrieved rule to the rule manager 830 (1740).

The rule manager 830 may transmit, to the editor 850, the rule received from the rule loader 840 (1750).

The editor 850 may edit the rule according to the request of the end user or the third party connected to the syndication portal 430. When the edition is completed, the editor 850 may transmit the edited rule to the reverse rule manager 860 (1760).

For example, the editor 850 may edit the rule using a jamper.

The reverse rule manager 860 may store the edited rule in the rule storage unit 820 (1770), and transmit the edited rule to the syndication portal 430 for a registration (1780). Through this, it is possible to terminate a setting process of a corresponding tool.

Figure 18:
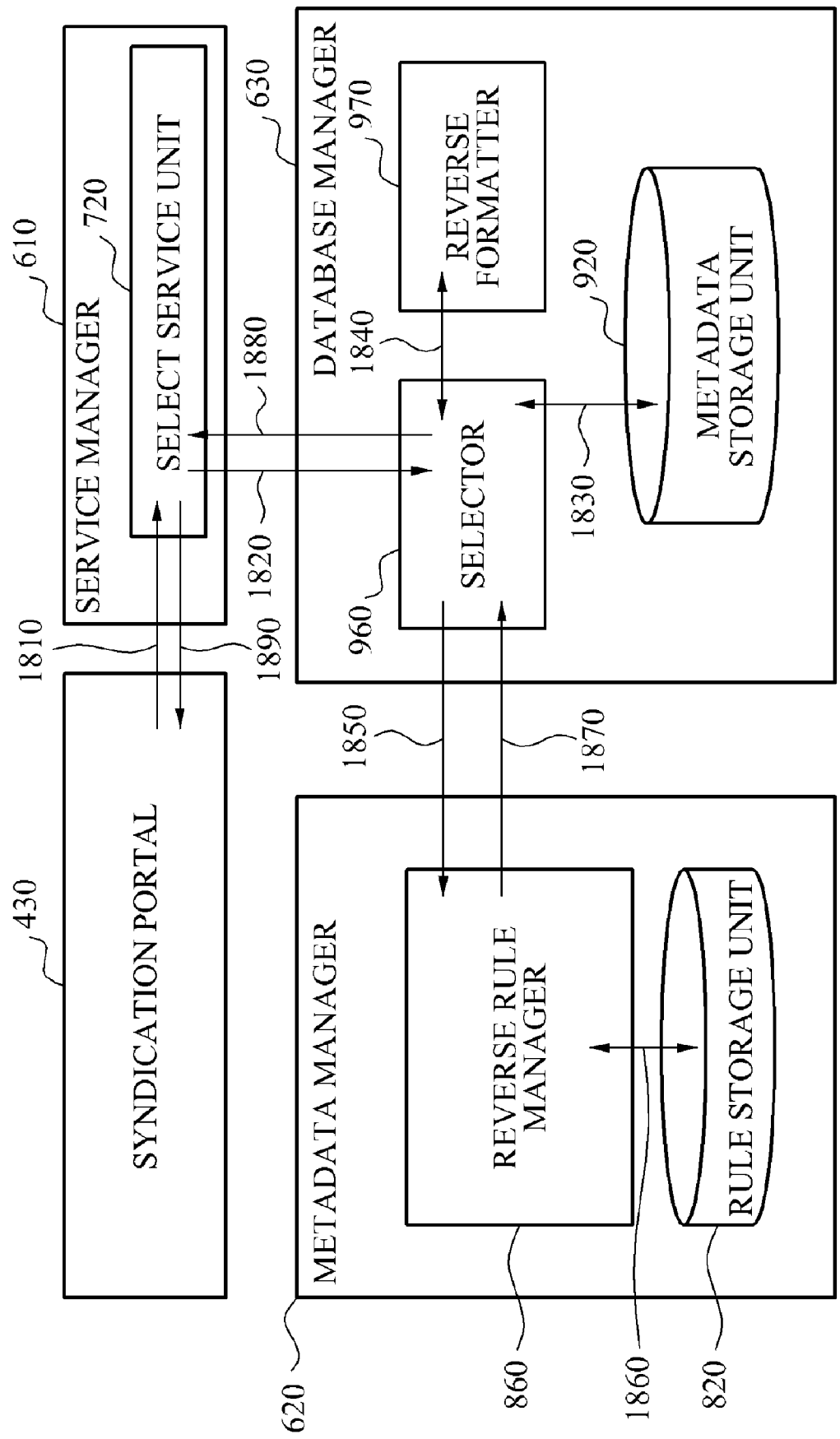
FIG. 18 is a diagram illustrating a process of changing and providing an encoded content according to an embodiment of the present invention.

FIG. 18 is a diagram illustrating a process of changing and providing an encoded content according to an embodiment of the present invention.

When the syndication portal 430 receives, from an end user or a third party, a request for a content satisfying a particular condition, the syndication portal 430 may request the select service unit 720 of the service manager 610 for information associated with the content (1810).

The select service unit 720 may request the selector 960 of the database manager 630 for content information (1820). The selector 960 may retrieve the content information from the metadata storage unit 920 (1830).

The selector 960 may transmit the content information to the reverse formatter 970 to transform the content information to an XML format managed by the syndication portal 430 (1840), and may request the reserve rule manager 860 of the metadata manager 620 for a reverse transformation (1850).

In this instance, the metadata transformed to the XML format by the reverse formatter 970 may be transmitted as metadata of the content to the third party terminal 470 according to a request of the third party.

For example, the reverse formatter 970 may transform the content information to an XML format used over an IPTV middleware.

The reverse rule manager 860 may retrieve, from the rule storage unit 820 according to a reverse transformation request, the rule edited by the end user or the third party (1860), and may transmit the edited rule to the select service unit 720 via the selector 960 (1870, 1880).

The select service unit 720 may transmit the edited rule to the syndication rule 430 (1890). The syndication portal 430 may request the encoding manager 640 to encode the content using the edited rule, and to transform the content to a format suitable for the end user or the third party. When the content transformed to the suitable format is transmitted from the encoding manager 640, the syndication portal 430 may provide the transformed content to the end user or the third party.

FIG. 19 is a diagram illustrating a process of managing, by the syndication portal 430, a feed according to an embodiment of the present invention.

When the syndication portal 430 receives a feed list request signal from the content provider terminal 210 in operation 1910, the syndication portal 430 may load feeds, stored in the system database 1110, according to the feed list request signal to obtain a feed list in operation 1920. In operation 1930, the syndication portal 430 may provide a content provider with the feed list and a main page so that the content provider may utilize the service operator interface 1120 or the content provider interface 1130.

When the syndication portal 430 receives a feed update request signal from the content provider terminal 210 in operation 1940, the syndication portal 430 may generate a feed based on the feed update request signal to add the feed to the system database 1110 in operation 1950, or may delete the feed from the system database 1110 in operation 1960.

In operation 1970, the syndication portal 430 may provide the content provider with a feed update result and the main page, so that the content provider may utilize the service operator interface 1120 or the content provider interface 1130.

FIG. 20 is a diagram illustrating a process of setting or modifying a metadata format of a content in a contents managing system according to an embodiment of the present invention.

When the syndication portal 430 receives, from the content provider terminal 210, a rule generation signal to generate a rule, or a rule modification signal to modify a rule stored in the rule storage unit 820 in operation 2010, the syndication portal 430 may verify user information stored in the system database 1110 according to the rule generation signal or the rule modification signal in operation 2020.

In this instance, the rule generation signal may denote a signal indicating generation of a rule with respect to a metadata format of the content provider. The rule modification signal may denote a signal indicating modifying of a rule with respect to the metadata format of the content provider. The user information may correspond to subscription information of the content provider.

When the content provider is authenticated using user information stored in the system database 1110 in operation 2030, the syndication portal 430 may request the orchestrator 810 for an access address to modify the rule in operation 2040.

The syndication portal 430 may receive the access address from the orchestrator 810 in operation 2050, and transfer the received access address to the content provider terminal 210 in operation 2060.

When the orchestrator 810 receives, from the content provider terminal 210, information associated with a rule to be generated or a portion of the rule to be modified in operation 2070, data may be exchanged between the content provider terminal 210 and the rule storage unit 820 according to FIG. 17 to thereby set a format in operation 2080 and 2085.

The orchestrator 810 may transmit, to the content provider terminal 210, a rule generation complete signal or a rule modification complete signal in operation 2090 to indicate the format is set according to FIG. 17. The rule generation complete signal or the rule modification complete signal may be differently transmitted depending on which one the syndication portal 430 receives between the rule generation signal and the rule modification signal.

When a third party desires to modify a rule of the third party using the third party terminal 470, the syndication portal 430 may replace the orchestrator 810 with the reverse orchestrator 870 to thereby perform operations shown in FIG. 20, and thereby modify the rule of the third party.

As described above, according to embodiments of the present invention, it is possible to provide all end users with contents uploaded from a plurality of service providers and content providers using different platforms, and transformed to a single platform, and thus to enable all the end users to receive a content provided by a service provider using a different platform by uploading the contents, and transforming the uploaded contents to the single platform.

Also, according to embodiments of the present invention, it is possible to easily increase a number of target users to receive a content by transforming an uploaded content to a platform desired by another service provider and then providing the other service provider with the content transformed to the desired platform.

Also, according to embodiments of the present invention, it is possible to enable a content provider to provide a content without a separate uploading process by enabling a system side to periodically verify and upload the content of the content provider.

The contents managing method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A non-transitory computer-readable storage medium having stored thereon, computer-executable components of a media mediator system that, when executed, implement a process for managing various formats of contents, the computer-executable components of the media mediator system comprising:

a service manager to receive a content and metadata of the content from a content provider in a format utilized by the content provider;

a metadata manager to register the content using the metadata, as an aggregator uploads the content as the content is added to a feed of the content provider and provides the content to the service manager, and to store the metadata of the content registered;

a database manager to store and manage information associated with the content; and an encoding manager to schedule an encoding sequence of content included in a content list received from the content provider and having status information indicating a "received" status, and to sequentially encode the content scheduled based on a scheduling result to a format utilized by at least one of the media mediator system and a third party, wherein the service manager comprises:

an update server unit to control a process of editing the metadata of the content stored in the database manager, the database manager updates the metadata of the content with an access path to encoded content and an access path to a thumbnail extracted by a thumbnailer, the metadata manager comprises:

a rule storage unit to store a rule comprising: a platform or a format of content, utilized by the content provider or the third party, information associated with a particular standard, and a metadata format of content;

an orchestrator to transform a metadata format of the content based on the rule stored by the rule storage unit;

an editor to edit a rule satisfying a particular condition, among rules stored by the rule storage unit, by executing a jamper according to a request of a third party; and a reverse orchestrator to transform the metadata format of the content based on the rule edited, and the feed comprises a least one of a folder set by the content provider to be shared for uploading, a site provide from syndication portal, and an address accessible to the content provided by the content provider.

2. The non-transitory computer-readable storage medium of claim 1, wherein the service manager further comprises:

a register service unit to control a process of registering the content received from the content provider; and a select service unit to control a process of transforming metadata of the content to a format employed by the media mediator system, so that the transformed metadata is used in a service managing the various formats of contents.

3. The non-transitory computer-readable storage medium of claim 1, wherein the metadata manager further comprises:

a rule loader to retrieve, from the rule storage unit, the rule satisfying the particular condition;

a rule manager to transmit the particular condition to the rule loader according to the request of the third party, so that the rule loader retrieves the rule to be edited, satisfying the particular condition, and to transmit, to the editor, the retrieved rule received from the rule loader; and a reverse rule manager to receive the edited rule, and to transmit the edited rule to the rule storage unit and the syndication portal to store the edited rule, and the orchestrator orchestrates the metadata of the content based on the stored rule.

4. The non-transitory computer-readable storage medium of claim 3, wherein the database manager comprises:

a metadata storage unit to store information associated with the content and the metadata;

an inserter to receive the orchestrated metadata of the content from the service manager, and to store the orchestrated metadata of the content in the metadata storage unit; and a formatter to transform the orchestrated metadata to a method schema used in the metadata storage unit.

5. The non-transitory computer-readable storage medium of claim 4, wherein the database manager further comprises:

a selector to retrieve metadata of the content from the metadata storage unit according to a request of the service manager, to transmit the retrieved metadata to a reverse formatter, and to request the metadata manager for reverse orchestrating of the metadata; and the reverse formatter to transform the metadata of the content to an Extensible Markup Language (XML) format according to a request of the selector.

6. The non-transitory computer-readable storage medium of claim 4, wherein:

information associated with the content comprises at least one of a Uniform Resource Identifier (URI) string for identifying the content, basic information of the content, information associated with a marker indicated at a play point when the content corresponds to a media content, a content credit, and a plurality of media link addresses with respect to the content, and the metadata comprises an encoding rule to encode the content.

7. The non-transitory computer-readable storage medium of claim 4, wherein the encoding manager comprises:

a receiver to periodically verify a content list received from the content provider, and to change, to a received status, content status information included in the verified content list;

a scheduler to receive, from the metadata manager, an encoding rule to encode a content being in the received status;

an encoder to receive, from the scheduler, the content being in the received status and the encoding rule, to encode the content being in the received status based on the encoding rule, and to change the content status information to an encoding complete status when encoding is completed; and a thumbnailer to extract a thumbnail from the content being in the received status.

8. The non-transitory computer-readable storage medium of claim 7, wherein the database manager further comprises:

an updater to update, to the metadata storage unit, an access path to the encoded content and an access path to the extracted thumbnail; and an encoding rule loader to extract the encoding rule from the metadata stored in the metadata storage unit to provide the extracted encoding rule to the encoding manager.

9. The non-transitory computer-readable storage medium of claim 7, wherein the scheduler transmits, to the updater, an access path to the encoded content and an access path to the extracted thumbnail.

10. A method of managing various formats of contents, the method comprising:
  setting, by an end user, a format of a content desired by the end user;
  receiving, by a service manager, the content and metadata of the content from a content provider in a format utilized by the content provider;
  registering, by a metadata manager, the content and the metadata of the content to a database manager as an aggregator uploads the content as the content is added to a feed of the content provider;
  scheduling, by an encoding manager, an encoding sequence of content included in a content list received from the content provider and having status information indicating a "received" status;
  encoding, by the encoding manager, the content included in the content list, based on a scheduling result, to a format utilized by at least one of a media mediator system and a third party;
  updating, by the database manager, metadata of the content encoded with an access path to the content encoded and an access path to a thumbnail extracted by a thumbnailer;
  providing, by the service manager, the encoded content to the end user; and
  editing, by the metadata manager, the metadata of the content registered to the database manager by the metadata manager,
  wherein the registering comprises:
    storing, by a rule storage unit of the metadata manager, a rule including a platform or format of content used by the content provider or the third party, information associated with a particular standard, and a metadata format of content;
    transforming and thereby registering, by an orchestrator of the metadata manager, a metadata format of the content based on the stored rule,
  the editing comprises:
    editing a rule satisfying a particular condition among rules stored by executing a jamper according to a request by the third party; and
    transforming the metadata format of the content based on the edited rule, and
  the feed comprises at least one of a folder set by the content provider to be shared for uploading, a site provide from syndication portal, and an address accessible to the content provided by the content provider.

11. The method of claim 10, wherein the registering further comprises:
  retrieving, by the metadata manager, a rule to transform the metadata of the content,
  wherein the transforming and thereby registering comprises:
    orchestrating, by the orchestrator of the metadata manager, the metadata of the content based on the retrieved rule; and
    storing and thereby registering, the orchestrated metadata of the content.

12. The method of claim 11, wherein:
  the retrieving comprises:
    requesting, by a register service unit of the service manager, the orchestrator to transform the content to a format used in a media mediator system; and
    retrieving, by the orchestrator from a rule storage unit according to a request of the register service unit, the rule to transform the metadata of the content, and
  the storing and thereby registering comprises:
    transmitting, by the register service unit, the orchestrated metadata to an inserter of the database manager to request a content registration;
    transmitting, by the inserter, the orchestrated metadata to a formatter to transform the orchestrated metadata to a method schema used in a metadata storage unit; and
    storing, by the inserter, the orchestrated metadata in the metadata storage unit to register the content.

13. The method of claim 10, wherein the providing comprises:
  requesting, by a select service unit of the service manager, a selector of the database manager for information associated with the content;
  retrieving, by the selector, information associated with the content from a metadata storage unit;
  transmitting, by the selector, information associated with the content to a reverse formatter to transform information associated with the content to an XML format;
  requesting, by the selector, a reverse rule manager of the metadata manager for a reverse transformation;
  retrieving, by the reverse rule manager from a rule storage unit according to the request for reverse transformation, a rule edited by an end user to transmit the edited rule to the select service unit via the selector;
  requesting, by the select service unit, the encoding manager to encode the content, and to transform the content to the format desired by the end user; and
  receiving, by the select service unit, the content transformed to the format desired by the end user to provide the transformed content to the end user.

* * * * *